(12) United States Patent
Price et al.

(10) Patent No.: US 12,002,265 B2
(45) Date of Patent: *Jun. 4, 2024

(54) CHARACTERIZING LIQUID REFLECTIVE SURFACES IN 3D LIQUID METAL PRINTING

(71) Applicant: XEROX CORPORATION, Norwalk, CT (US)

(72) Inventors: Robert R. Price, Palo Alto, CA (US); Raja Bala, Pittsford, NY (US); Svyatoslav Korneev, San Jose, CA (US); Christoforos Somarakis, Gilroy, CA (US); Matthew Shreve, Campbell, CA (US); Adrian Lew, Stanford, CA (US); Palghat Ramesh, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 429 days.

This patent is subject to a terminal disclaimer.

(21) Appl. No.: 17/356,604

(22) Filed: Jun. 24, 2021

(65) Prior Publication Data

US 2022/0414380 A1    Dec. 29, 2022

(51) Int. Cl.
*G06V 20/40*    (2022.01)
*B41J 2/045*    (2006.01)
(Continued)

(52) U.S. Cl.
CPC .......... *G06V 20/46* (2022.01); *B41J 2/04536* (2013.01); *G06F 18/214* (2023.01);
(Continued)

(58) Field of Classification Search
CPC ......... B33Y 50/02; B33Y 30/00; B33Y 10/00; B29C 64/393; B29C 64/209;
(Continued)

(56) References Cited

U.S. PATENT DOCUMENTS 9,289,981 B2    3/2016    Komada et al.
9,682,548 B2    6/2017    Ohnishi
(Continued)

FOREIGN PATENT DOCUMENTS

WO    2020/247895 A1    12/2020

OTHER PUBLICATIONS

Korneev et al., "Fabricated shape estimation for additive manufacturing processes with uncertainty," Computer-Aided Design, vol. 127, 2020, 102852, ISSN 0010-4485, https://doi.org/10.1016/j.cad.2020.102852.(https://www.sciencedirect.com/science/article/pii/S0010448520300452) (Year: 2020).*

(Continued)

*Primary Examiner* — Ross Varndell
(74) *Attorney, Agent, or Firm* — MH2 Technology Law Group LLP

(57) ABSTRACT

A method includes defining a model for a liquid while the liquid is positioned at least partially within a nozzle of a printer. The method also includes synthesizing video frames of the liquid using the model to produce synthetic video frames. The method also includes generating a labeled dataset that includes the synthetic video frames and corresponding model values. The method also includes receiving real video frames of the liquid while the liquid is positioned at least partially within the nozzle of the printer. The method also includes generating an inverse mapping from the real video frames to predicted model values using the labeled dataset. The method also includes reconstructing the liquid in the real video frames based at least partially upon the predicted model values.

19 Claims, 38 Drawing Sheets

(51) Int. Cl.
  *G06F 18/214* (2023.01)
  *G06F 18/2413* (2023.01)
  *G06N 3/08* (2023.01)

(52) U.S. Cl.
  CPC ......... *G06F 18/24147* (2023.01); *G06N 3/08* (2013.01); *G06V 20/49* (2022.01); *G06V 2201/07* (2022.01)

(58) Field of Classification Search
  CPC .... B29C 64/112; G06V 10/82; G06V 10/764; G06V 2201/06; G06V 20/64; G06V 10/141; G06N 3/08; G06N 20/00
  See application file for complete search history.

(56) References Cited

U.S. PATENT DOCUMENTS

| | | | |
|---|---|---|---|
| 10,854,006 B2 | 12/2020 | Shreve et al. | |
| 11,014,154 B2 | 5/2021 | Feng | |
| 11,014,156 B2 | 5/2021 | Feng | |
| 11,160,635 B2* | 11/2021 | Hegland | A61C 5/85 |
| 11,599,986 B2 | 3/2023 | Afrasiabi et al. | |
| 2017/0173878 A1* | 6/2017 | Myerberg | B22F 12/13 |
| 2017/0252811 A1* | 9/2017 | Myerberg | B33Y 30/00 |
| 2019/0118258 A1* | 4/2019 | Sachs | B29C 64/393 |
| 2021/0379664 A1* | 12/2021 | Gibson | B22F 12/57 |
| 2021/0390224 A1* | 12/2021 | Korneev | G06N 3/04 |
| 2022/0176622 A1* | 6/2022 | Lin | B29C 64/20 |
| 2022/0355536 A1 | 11/2022 | Bala et al. | |
| 2022/0381666 A1 | 12/2022 | Gopalkrishna et al. | |
| 2022/0410273 A1 | 12/2022 | Price et al. | |
| 2022/0414380 A1 | 12/2022 | Price et al. | |

OTHER PUBLICATIONS

T. Cover and P. Hart, "Nearest neighbor pattern classification," in IEEE Transactions on Information Theory, vol. 13, No. 1, pp. 21-27, Jan. 1967, doi: 10.1109/TIT.1967.1053964. (Year: 1967).*

Barter et al., "Imaging surface-wave analyzer for liquid surfaces," Applied Optics, vol. 36, No. 12, Apr. 20, 1997, 2630-2635.

* cited by examiner

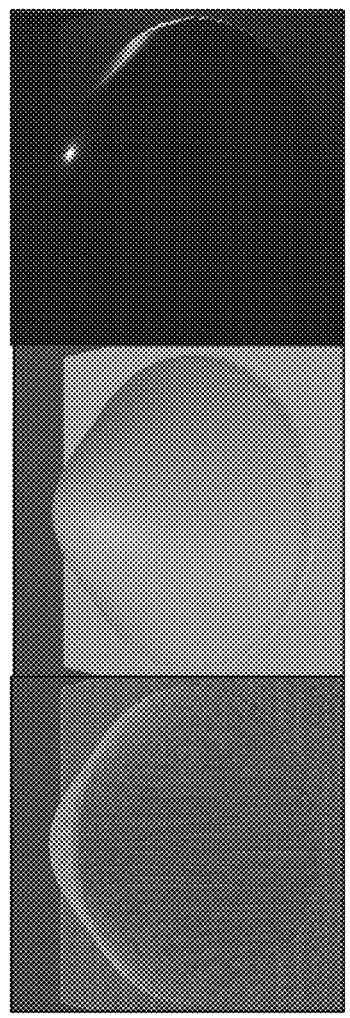

| Frame# | 172 | 176 | 179 | 186 | 189 |
|---|---|---|---|---|---|
| Lab Video | | | | | |
| Inferred Parameters | P: -0.11<br>A: -0.00<br>B: -0.09<br>D: -0.10<br>S: 0.03 | P: -0.13<br>A: 0.27<br>B: -0.05<br>D: 0.01<br>S: 0.02 | P: -0.09<br>A: 0.23<br>B: -0.05<br>D: 0.08<br>S: 0.01 | P: -0.11<br>A: 0.28<br>B: -0.05<br>D: 0.03<br>S: 0.00 | P: -0.11<br>A: -0.02<br>B: -0.05<br>D: 0.02<br>S: 0.03 |
| Diffuse rerendering from Parameters | | | | | |
| Specular rerendering from Parameters | | | | | |

FIG. 18

CHARACTERIZING LIQUID REFLECTIVE SURFACES IN 3D LIQUID METAL PRINTING

TECHNICAL FIELD

The present teachings relate generally to three-dimensional (3D) printing and, more particularly, to characterizing the liquid reflective surface(s) of the meniscus of a liquid metal drop when the liquid metal drop is in a nozzle of the 3D printer.

BACKGROUND

A 3D printer builds (e.g., prints) a 3D object from a computer-aided design (CAD) model, usually by successively depositing material layer upon layer. For example, a first layer may be deposited upon a substrate, and then a second layer may be deposited upon the first layer. One particular type of 3D printer is a magnetohydrodynamic (MHD) printer, which is suitable for depositing liquid metal layer upon layer to form a 3D metallic object. Magnetohydrodynamic refers to the study of the magnetic properties and the behavior of electrically conducting fluids.

In a MHD printer, an electrical current flows through a metal coil, which produces time-varying magnetic fields that induce eddy currents within a reservoir of liquid metal compositions. Coupling between magnetic and electric fields within the liquid metal results in Lorentz forces that cause drops of the liquid metal to be ejected (also referred to as jetted) through a nozzle of the printer. The nozzle may be controlled to select the size and shape of the drops. The drops land upon the substrate and/or the previously deposited drops to cause the object to grow in size.

The drops may be analyzed prior to landing. Stereo imaging may be used to estimate depth, which can be converted to a shape. However, stereo imaging does not work well with highly specular surfaces (e.g., drops made of liquid metal) because the pattern of light on specular surfaces changes dramatically with the viewing angle, which makes it difficult to match patches between two images in stereo vision. Stereo imaging is also difficult to apply to complex patterns of highlights generated by diffraction of light on transparent liquids. Another conventional technique is to extract the shape from orthogonal profiles of an object (e.g., a drop). More particularly, when viewed from the side, the shape of the drop can be traced as an outline in the image. However, it may be difficult to infer the shape of the drop from orthogonal views of the profile of the drop because the nozzle is recessed or shrouded to maintain physical properties of the environment, and the camera cannot be introduced into the nozzle shroud.

Therefore, what is needed is an improved system and method for characterizing liquid reflective surfaces of the meniscus of a liquid metal drop when the liquid metal drop is at least partially within a nozzle of the 3D printer.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method is disclosed. The method includes defining a model for a liquid while the liquid is positioned at least partially within a nozzle of a printer. The method also includes synthesizing video frames of the liquid using the model to produce synthetic video frames. The method also includes generating a labeled dataset that includes the synthetic video frames and corresponding model values. The method also includes receiving real video frames of the liquid while the liquid is positioned at least partially within the nozzle of the printer. The method also includes generating an inverse mapping from the real video frames to predicted model values using the labeled dataset. The method also includes reconstructing the liquid in the real video frames based at least partially upon the predicted model values.

In another embodiment, a visual-based method for performing diagnostics on a printer is also disclosed. The method includes defining a parametric model for a surface of a liquid while the liquid is positioned at least partially within a nozzle of the printer. The surface of the liquid includes a meniscus. The method also includes synthesizing video frames of the meniscus of the liquid with a graphics simulator using the parametric model to produce synthetic video frames. The method also includes generating a labeled dataset that includes the synthetic video frames and corresponding parametric model values. The method also includes receiving real video frames of the liquid while the liquid is positioned at least partially within the nozzle of the printer. The synthetic video frames simulate the real video frames. The method also includes generating an inverse mapping from the real video frames to predicted parametric model values using the labeled dataset. The predicted parametric model values are a subset of the parametric model parameter values. The method also includes reconstructing a shape and a motion of the meniscus of the liquid in the real video frames based at least partially upon the predicted parametric model values.

In another embodiment, a method for characterizing a behavior of a liquid while the liquid is positioned at least partially within a nozzle of a printer is disclosed. The method includes defining a parametric model for a surface of the liquid while the liquid is positioned at least partially within the nozzle of the printer. The surface of the liquid includes a meniscus. The method also includes synthesizing video frames of the meniscus of the liquid with a graphics simulator using the parametric model to produce synthetic video frames. The method also includes generating a labeled dataset that includes the synthetic video frames and corresponding parametric model values. The parametric model values include: a first relative weight of a first Bessel function that describes an oscillation of the liquid, a second relative weight of a second Bessel function that describes the oscillation of the liquid, a constant offset, and a constant representing a steady state shape of the meniscus at rest. The method also includes jetting the liquid through the nozzle. The method also includes illuminating the liquid with a light source when the liquid is positioned at least partially within the nozzle. The method also includes receiving real video frames of the liquid while the liquid is positioned at least partially within the nozzle. The synthetic video frames simulate the real video frames. The method also includes generating an inverse mapping from the real video frames to predicted parametric model values using the labeled dataset. The predicted parametric model values are a subset of the parametric model parameter values. Generating the inverse mapping includes: training an artificial neural network using the labeled dataset to predict the predicted parametric model values in the real video frames; or selecting an entry from the labeled dataset that is most similar, in mean-square error, to the real video frames using direct nearest-neighbor matching. The method also includes reconstructing a shape and a motion of the meniscus of the liquid in the real video frames based at least partially upon the predicted parametric model values. The method also includes extracting one or more metrics from the reconstructed meniscus. The metrics include a carrier oscillation frequency, a pulse-to-pulse covariance, a waveform decay rate, or a combination thereof. The method also includes adjusting one or more parameters of the printer based at least partially upon the one or more metrics to adjust the meniscus.

In another embodiment, a 3D printer is disclosed. The 3D printer includes a nozzle. The 3D printer also includes a camera configured to capture a real image or a real video of a liquid metal while the liquid metal is positioned at least partially within the nozzle. The 3D printer also includes a computing system configured to generate a model of the liquid metal positioned at least partially within the nozzle. The computing system is also configured to generate a simulated image or a simulated video of the liquid metal positioned at least partially within the nozzle based at least partially upon the model. The computing system is also configured to generate a labeled dataset that includes the simulated image or the simulated video and a first set of parameters. The computing system is also configured to reconstruct the liquid metal in the real image or the real video based at least partially upon the labeled dataset.

In another embodiment, a 3D printer configured to print a 3D object is disclosed. The 3D printer includes a nozzle. The 3D printer also includes a camera configured to capture a plurality of real images of a plurality of drops of liquid metal while the drops are positioned at least partially within the nozzle. Each drop includes a meniscus. The 3D printer also includes a computing system configured to generate a parametric model of motion of the menisci of the drops positioned at least partially within the nozzle based at least partially upon the real images. The computing system is also configured to generate a plurality of simulated images of the drops positioned at least partially within the nozzle based at least partially upon the parametric model. The computing system is also configured to generate a labeled dataset that includes the simulated images and a first set of parameters. The computing system is also configured to inverse map the real images to a second set of parameters, based at least partially upon the labeled dataset. The computing system is also configured to reconstruct the menisci of the drops in the real images based at least partially upon the second set of parameters. The computing system is also configured to extract one or more metrics from the reconstructed menisci of the drops. The metrics include a carrier oscillation frequency, a pulse-to-pulse covariance, a waveform decay rate, or a combination thereof. The computing system is also configured to adjust one or more parameters of the 3D printer based at least partially upon the one or more metrics to adjust the menisci of the drops positioned at least partially within the nozzle.

In another embodiment, a 3D printer configured to print a 3D object by jetting a plurality of drops of liquid metal of onto a substrate is disclosed. The 3D printer includes an ejector having a nozzle. The 3D printer also includes a heating element configured to heat a solid metal within the ejector, thereby converting the solid metal to the liquid metal. The 3D printer also includes a coil wrapped at least partially around the ejector. The 3D printer also includes a power source configured to transmit voltage pulses to the coil. The coil causes the plurality of drops of the liquid metal to be jetted through the nozzle in response to the voltage pulses. The 3D printer also includes a camera configured to capture a plurality of real images of the drops while the drops are positioned at least partially within the nozzle. Each drop includes a meniscus. The 3D printer also includes a light source configured to illuminate the nozzle and the drops as the real images are captured. The 3D printer also includes a computing system configured to generate a parametric model of dynamic motion of the menisci of the drops positioned at least partially within the nozzle based at least partially upon the real images. The computing system is also configured to generate a plurality of simulated images of the drops positioned at least partially within the nozzle based at least partially upon the parametric model. The computing system is also configured to generate a labeled dataset that includes the simulated images and a first set of parameters. The first set of parameters includes: a first relative weight of a first Bessel function that describes an oscillation of the liquid; a second relative weight of a second Bessel function that describes the oscillation of the liquid; a constant offset; and a constant representing a steady state shape of the meniscus at rest. The computing system is also configured to inverse map the real images to a second set of parameters, based at least partially upon the labeled dataset. Inverse mapping includes: training an artificial neural network using the labeled dataset to predict the second set of parameters in the real images; or selecting an entry in the labeled dataset that is most similar, in mean-square error, to the real images using direct nearest-neighbor matching. The computing system is also configured to reconstruct the menisci of the drops in the real images based at least partially upon the second set of parameters. The computing system is also configured to extract one or more metrics from the reconstructed menisci of the drops. The metrics include a carrier oscillation frequency, a pulse-to-pulse covariance, and a waveform decay rate. The computing system is also configured to adjust one or more parameters of the 3D printer based at least partially upon the one or more metrics to adjust a shape, an amplitude, or both of the menisci of the drops positioned at least partially within the nozzle.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIGS. 11A-11C depict simulated images of the meniscus, according to an embodiment. More particularly, FIG. 11A depicts an axis-symmetric triangular mesh of the simulated meniscus, FIG. 11B depicts a 3D solid rendering of the simulated meniscus showing edges protruding past the nozzle by a small amount, and FIG. 11C depicts a rendering of the simulated meniscus showing sparse specular highlights on the metallic drop surface.

FIG. 18 depicts a parameter inference from individual frames of real video together with re-renderings of parameters, according to an embodiment.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Characterizing Meniscus Behavior in 3D Liquid Metal Printing

During 3D printing with a liquid metal, the liquid metal is separated into individual drops within a nozzle of the 3D printer, and the drops are jetted (also referred to as ejected) one by one in a discrete manner. The lower surface of a drop may have a meniscus while the drop is positioned at least partially in the nozzle (e.g., just prior to being jetted). The behavior of the meniscus may provide information about the internal characteristics of the inside the 3D printer (e.g., the nozzle) that affect the properties of the jetting and/or properties of the printed 3D metallic object formed by the drops. Thus, the present disclosure is directed to characterizing the meniscus of the (e.g., lower surface) drops while the drops are positioned at least partially within the nozzle.

In order for the drops to be consistent in form and motion, the meniscus oscillation after one drop is jetted through the nozzle may decay rapidly and acquiesce before the next drop is jetted. In one embodiment, the meniscus behavior may be characterized by capturing high-speed videos of the nozzle during printing, and performing visual assessment of the surface behavior of the meniscus between jettings. In another embodiment, the characterization of the meniscus behavior may be automated. For example, the meniscus behavior may be quantified using video analysis and/or by machine learning (ML) to the high-speed videos.

Figure 1:
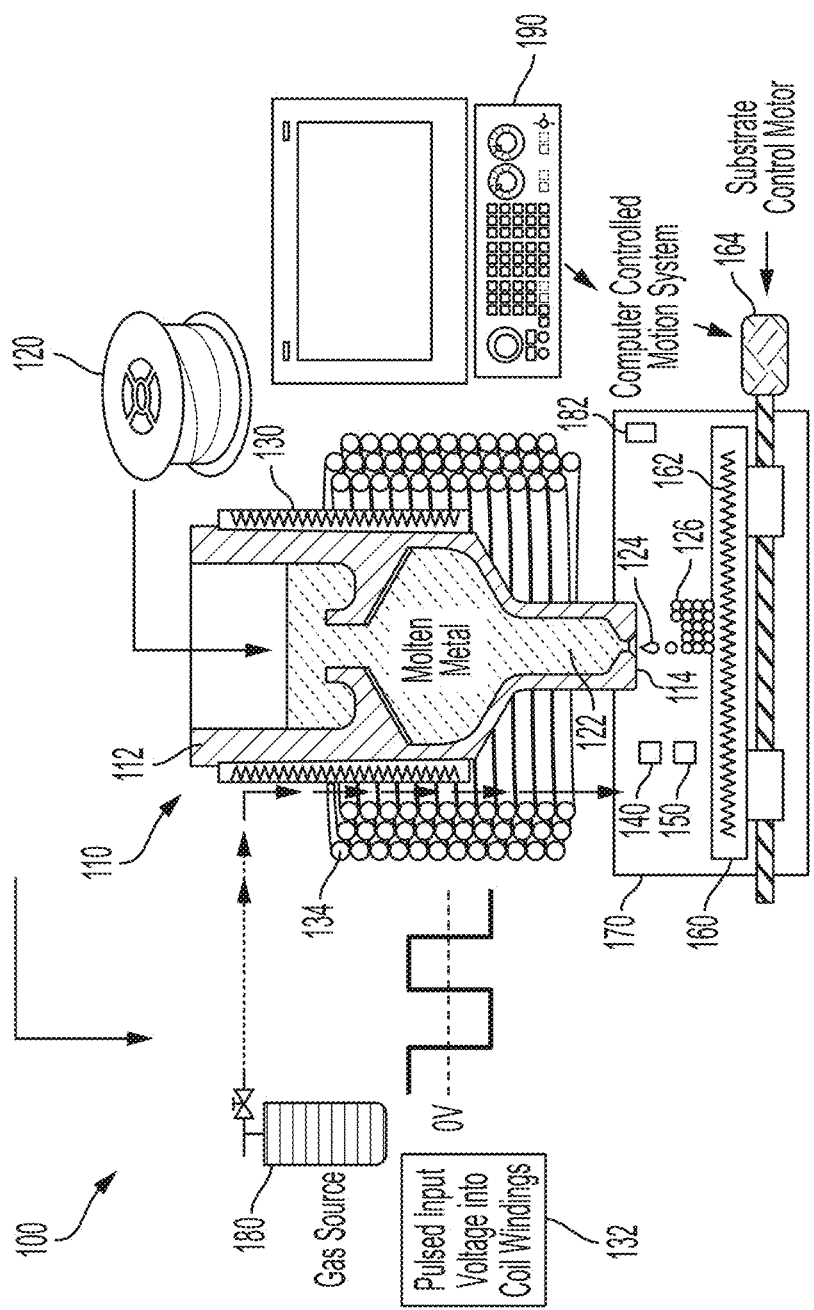
FIG. 1 depicts a schematic cross-sectional view of a 3D printer, according to an embodiment.

FIG. 1 depicts a schematic cross-sectional view of a 3D printer 100, according to an embodiment. The 3D printer 100 may include an ejector (also referred to as a pump chamber) 110. The ejector 110 may define an inner volume that is configured to receive a printing material 120. The printing material 120 may be or include a metal, a polymer (e.g., a photopolymer), or the like. For example, the printing material 120 may be or include aluminum (e.g., a spool of aluminum wire).

The 3D printer 100 may also include one or more heating elements 130. The heating elements 130 are configured to melt the printing material 120 within the inner volume of the ejector 110, thereby converting the printing material 120 from a solid material to a liquid material (e.g., liquid metal) 122 within the inner volume of the ejector 110.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorenz force. The Lorenz force creates a pressure at an inlet of a nozzle 114 of the ejector 110. The pressure causes the liquid metal 122 to be jetted through the nozzle 114 in the form of one or more drops 124.

The 3D printer 100 may also include one or more cameras (one is shown: 140) that is/are configured to capture video and/or images of the nozzle 114, the drops 124, or both. In one embodiment, the video may include signals derived from a sequence of images. In another embodiment, the images may be or include frames of the video. In one particular example, a strobe construction of the jetting may be achieved by capturing a plurality of individual images/frames with different time delays from multiple drop ejections. The camera 140 may be or include a high-speed camera that is configured to capture the images and/or video at a rate of from about 2,000 frames per second to about 50,000 frames per second or about 10,000 frames per second to about 30,000 frames per second (e.g., 19,000 frames per second). In one example, the jetting may occur at a frequency from about 100 Hz to about 1000 Hz, and the camera 140 may operate at a frequency from about 10,000 frames per second to about 50,000 frames per second. In one embodiment, front face monitoring during the jetting of the drops may be triggered by the 3D printer 100 as a normal checkup, operator intervention, detection of irregular jetting, and/or by detection of greater than usual deviations of the 3D printer 100.

The 3D printer 100 may also include one or more light sources (one is shown: 150) that is/are configured to shine light on the nozzle 114, the drops 124, or both. The light source 150 may be or include a fiber optic light source. The light source 150 may be or include a collimated light source. The light source 150 may be or include a white light source.

The 3D printer 100 may also include a substrate (also referred to as a build plate) 160 that is positioned below the nozzle 114. The drops 124 that are jetted through the nozzle 114 may land on the substrate 160 and cool and solidify to produce a 3D object 126. The substrate 160 may include a heater 162 therein that is configured to increase the temperature of the substrate 160. The 3D printer 100 may also include a substrate control motor 164 that is configured to move the substrate 160 as the drops 124 are being jetted (i.e., during the printing process) to cause the 3D object 126 to have the desired shape and size. The substrate control motor 164 may be configured to move the substrate 160 in one dimension (e.g., along an X axis), in two dimensions (e.g., along the X axis and a Y axis), or in three dimensions (e.g., along the X axis, the Y axis, and a Z axis). In another embodiment, the ejector 110 and/or the nozzle 114 may be also or instead be configured to move in one, two, or three dimensions.

In one embodiment, the 3D printer 100 may also include an enclosure 170. The enclosure 170 may be positioned at least partially around the ejector 110, the nozzle 114, the drops 124, the 3D object 126, the heating elements 130, the coils 134, the camera 140, the light source 150, the substrate 160, or a combination thereof. In one embodiment, the enclosure 170 may be hermetically sealed. In another embodiment, the enclosure 170 may not be hermetically sealed. In other words, the enclosure 170 may have one or more openings that may allow gas to flow therethrough. For example, the gas may flow out of the enclosure 170 through the openings.

In one embodiment, the 3D printer 100 may also include one or more gas sources (one is shown: 180). The gas source 180 may be positioned outside of the enclosure 170 and configured to introduce gas into the enclosure 170. The gas source 180 may be configured to introduce a gas that flows (e.g., downward) around the ejector 110, the nozzle 114, the heating elements 130, or a combination thereof. The gas may flow around and/or within the coils 134. The gas may flow into the enclosure 170 and/or proximate to (e.g., around) the drops 124, the 3D object 126, and/or the substrate 160.

The 3D printer 100 may also include a gas sensor 182. The gas sensor 182 may be positioned within the enclosure 170. The gas sensor 182 may also or instead be positioned proximate to the drops 124, the 3D object 126, and/or the substrate 160 (e.g., in an embodiment where the enclosure 170 is omitted). The gas sensor 182 may be configured to measure a concentration of the gas, oxygen, or a combination thereof.

The 3D printer 100 may also include a computing system 190. The computing system 190 may be configured to control the introduction of the printing material 120 into the ejector 110, the heating elements 130, the power source 132, the camera 140, the light source 150, the substrate control motor 164, the gas source 180, the gas sensor 182, or a combination thereof. For example, the computing system 190 may be configured to receive the images and/or video from the camera 140 and to characterize the behavior of the meniscus on the lower surface of the drops 124 while the drops are positioned at least partially within the nozzle 114. The computing system 190 may also be configured to adjust one or more parameters of the 3D printer based at least partially upon the behavior of the meniscus. The behavior of the meniscus and/or the adjustment of the parameters may be part of a real-time closed loop control system provided by the computing system 190.

Figure 2:
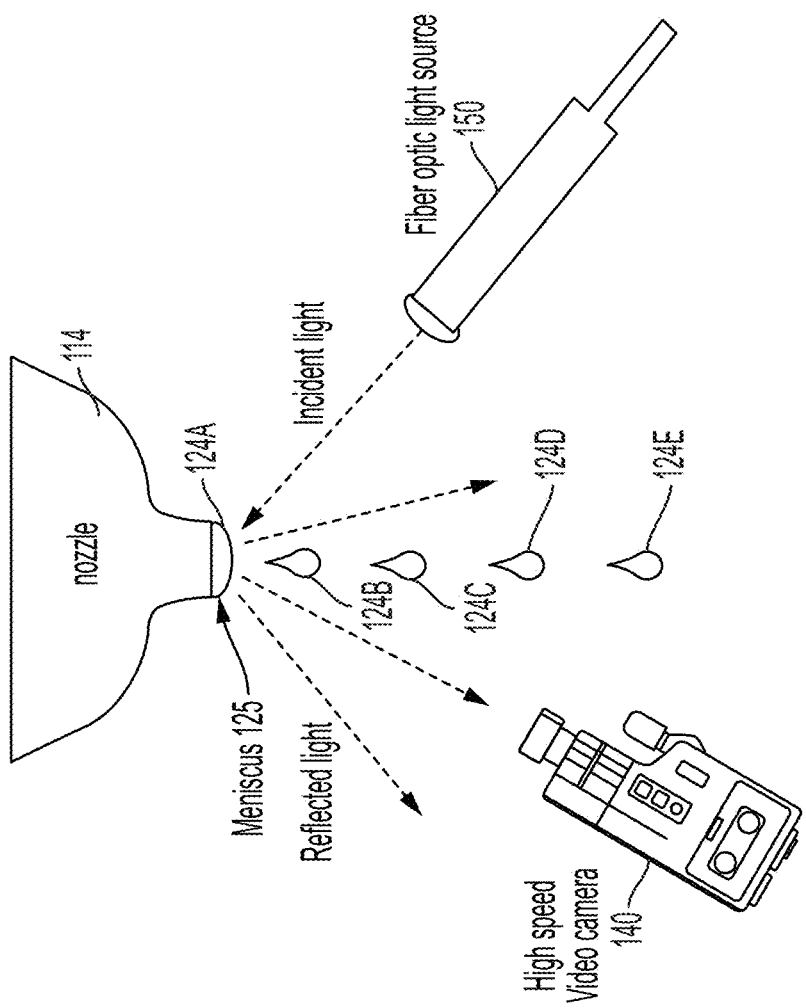
FIG. 2 depicts a side view of a portion of FIG. 1, according to an embodiment.

FIG. 2 depicts a side view of a portion of FIG. 1, according to an embodiment. More particularly, FIG. 2 depicts a side view of the nozzle 114, the camera 140, and the light source 150. In FIG. 2, five drops 124A-124E of the liquid printing material 120 are shown. The drop 124A is positioned at least partially within the nozzle 114, and the drops 124B-124E have already been jetted from the nozzle 114 and are descending toward the substrate 160 (not shown in FIG. 2).

The camera 140 and/or the light source 150 may be directed at/toward at least a portion of the liquid printing material 120 that is positioned at least partially within the nozzle 114. Said another way, the camera 140 and/or the light source 150 may be directed at/toward at one of the drops 124A that is positioned at least partially within the nozzle 114 (e.g., before the drop 124A has been jetted from the nozzle 114). More particularly, the camera 140 and/or the light source 150 may be directed at/toward a meniscus 125 of the liquid printing material 120 (e.g., drop 124A) that is positioned at least partially within the nozzle 114. The meniscus 125 refers to the convex and/or crescent shape of the lower surface of the liquid printing material 120 (e.g., drop 124A). In the embodiment shown, the meniscus 125 is at least partially outside (e.g., below) the lower end of the nozzle 114. In another embodiment (not shown), the meniscus 125 may be at least partially or fully inside/within the nozzle 114, such that the lowermost part of the liquid printing material 120 (or drop 124A) would not be seen in the side view of FIG. 2.

Figure 3:
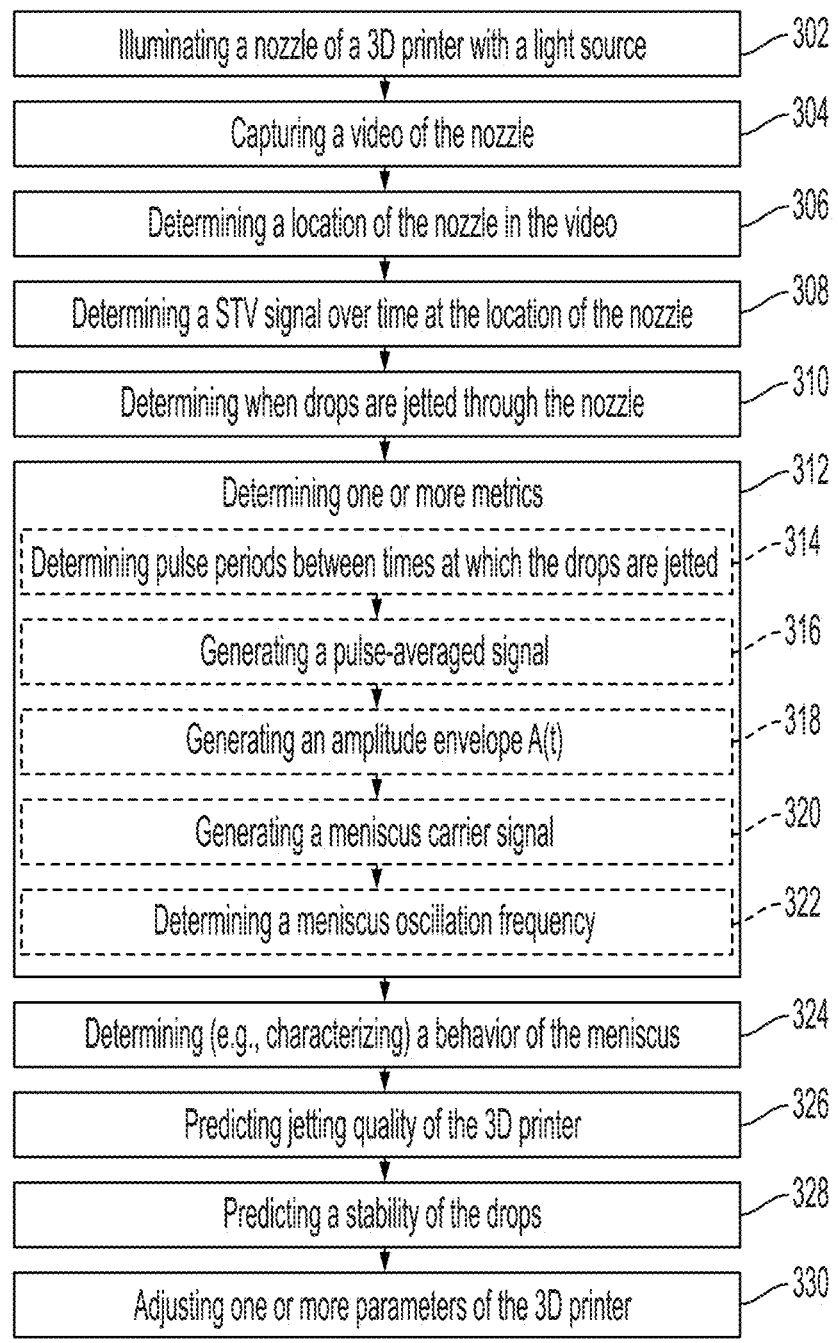
FIG. 3 depicts a flowchart of a method for printing a 3D object, according to an embodiment.

FIG. 3 depicts a flowchart of a method 300 for printing the 3D object 126, according to an embodiment. More particularly, the method 300 may characterize a behavior of the meniscus 125 of the liquid printing material 120 (e.g., the drop 124A) when the drop 124A is positioned at least partially within the nozzle 114. The method 300 is particularly applicable to liquid metal drops 124A-124E in 3D printing applications (as opposed to non-metal drops and/or non 3D printing applications) because metallic drops produce specular highlights, and analysis of these specular highlights provided by the method 300 may provide information and insight into the oscillation of the liquid metal surface (e.g., the meniscus 125) of the drop 124A. The behavior (e.g., oscillation) of the meniscus 125 may be directly related to the stability of the drop 124A, which in turn affects the quality of the 3D object 126.

An illustrative order of the method 300 is provided below; however, one or more steps of the method 300 may be performed in a different order, performed simultaneously, repeated, or omitted. One or more steps of the method 300 may be performed (e.g., automatically) by the computing system 190.

The method 300 may include illuminating the nozzle 114 with the light source 150, as at 302. This may include illuminating the liquid printing material 120 (e.g., drop 124A) positioned at least partially within the nozzle 114. For example, this may include illuminating the meniscus 125 of the liquid printing material 120 (e.g., drop 124A) positioned at least partially within the nozzle 114.

The method 300 may also include capturing a video of the nozzle 114, as at 304. This may include capturing a video of the liquid printing material 120 (e.g., drop 124A) positioned at least partially within the nozzle 114. For example, this may include capturing a video of the meniscus 125 of the liquid printing material 120 (e.g., drop 124A) positioned at least partially within the nozzle 114. This step may also include capturing a video of the drop 124A as the drop 124A descends from the nozzle 114 (e.g., to the substrate 160). As mentioned above, as used herein, a video may include a plurality of images. Thus, this step may also or instead include capturing a plurality of images of the nozzle 114.

Figure 4:
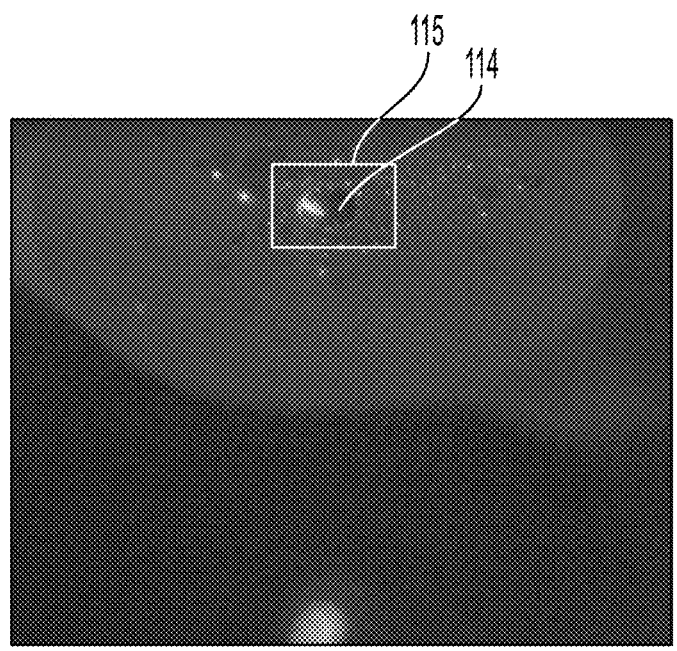
FIG. 4 depicts a frame (e.g., an image) from a video that identifies a location of a nozzle of the 3D printer, according to an embodiment.

The method 300 may also include determining a location 115 of the nozzle 114 in the video, as at 306. The location 115 of the nozzle 114 may be determined by the computing system 190 based at least partially upon the video. FIG. 4 depicts a frame (e.g., an image) 400 from the video that identifies the location 115 of the nozzle 114, according to an embodiment. For each x-y location in the video, a 3D window may be positioned (e.g., centered) around that location, and the 3D window may be run over a temporal dimension in a sliding fashion. A spatiotemporal variance (STV) may be determined over time proximate to the nozzle 114. The minimum STV value may be identified and may as an indicator of drop-induced motion at that spatial location, denoted $V_{xy}$. This process may be repeated over the two spatial dimensions x-y, and the x-y location that maximizes $V_{xy}$ may be determined to be the location 115 of the nozzle 114. The location 115 may be a 2D or 3D box. One or more of the following steps of the method 300 may be performed within the location 115 (e.g., the box representing the nozzle region). The location 115 may also be referred to as the region of interest (ROI).

The geometry of the 3D surface of the meniscus 125 may be difficult to measure precisely; however, the behavior (e.g., movement, motion, etc.) of the meniscus 125 may manifest itself in the video in terms of a spatiotemporal pattern of specular highlights. As used herein, "specular highlights" refer to the phenomenon of light reflecting off of the front surface of the liquid (e.g., the drop 124A). More particularly, the specular highlight(s) may move as the meniscus 125 moves, and the movement of the specular highlight(s) may be used to determine or infer the characteristics of the (movement of the) meniscus 125. Thus, once the location 115 of the nozzle 114 has been determined, the method 300 may also include determining (e.g., measuring and/or plotting) a STV signal over time at the location 115 of the nozzle 114, as at 308. The STV signal may be determined by the computing system 190 based at least partially upon the video (e.g., using a spatiotemporal variance-guided filter (SVGF)). As described below, the STV signal may be used to determine the behavior of the meniscus 125 over time.

Figure 5:
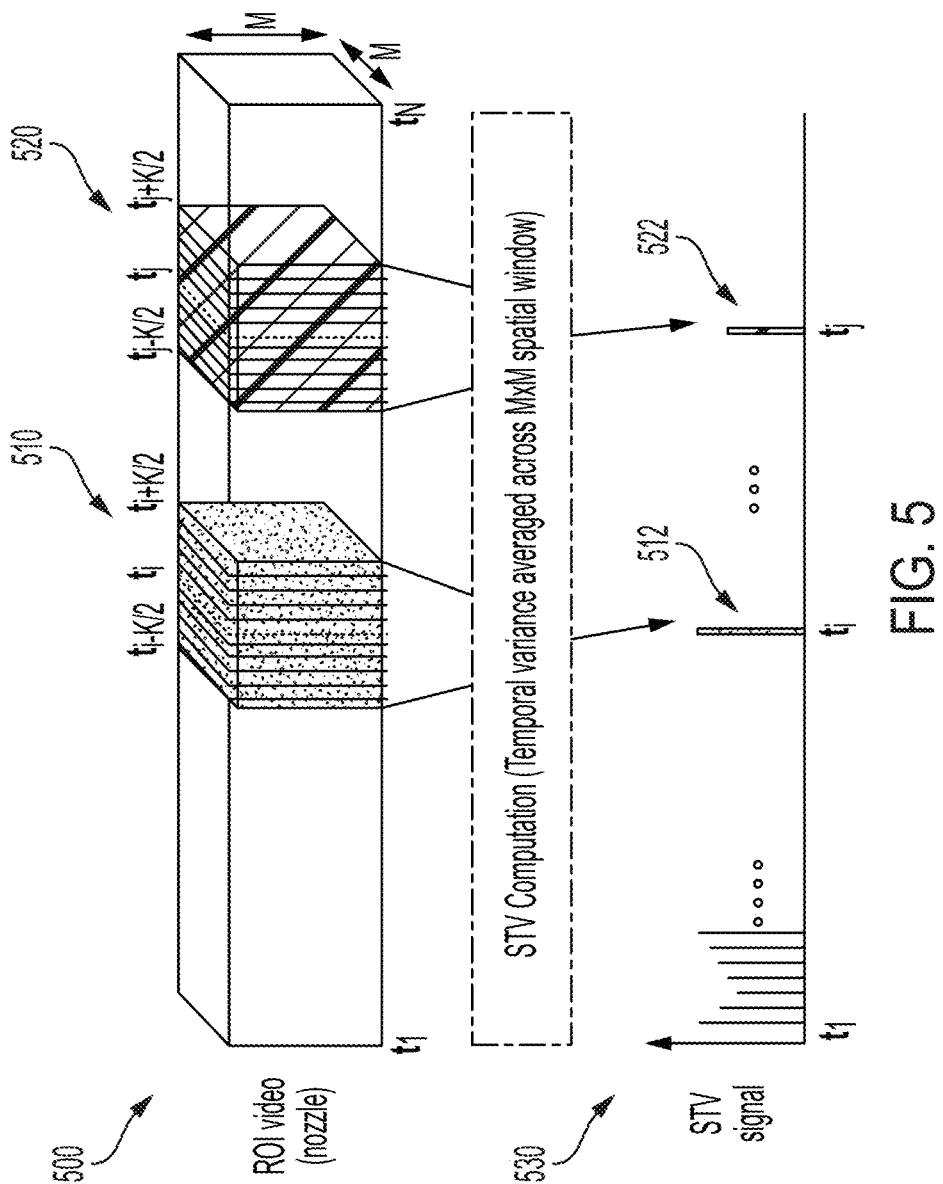
FIG. 5 depicts a schematic view of an example of a 3D view of the video of the nozzle, according to an embodiment.

FIG. 5 depicts a schematic view of an example of a 3D view of the video 500 of the nozzle 114, according to an embodiment. The video 500 is plotted as a temporal waveform. The STV signal may be measured within a window within the video 500. For example, the STV signal may be measured within an M×M×K spatiotemporal window within the video 500, where M is the spatial extent in pixels, and K is the number of frames. In one embodiment, the STV signal may be determined as the variance of pixels computed over time at one or more M×M fixed spatial locations (e.g., locations 510, 520), and then the average of these variances at the M×M fixed spatial locations 510, 520 may be determined to obtain an average STV signal for the 3D block. Below the 3D view of the video 500 is the STV signal 530, which includes the average 512 of the M×M fixed spatial location 510 and the average 522 of the M×M fixed spatial location 520.

Figure 6:
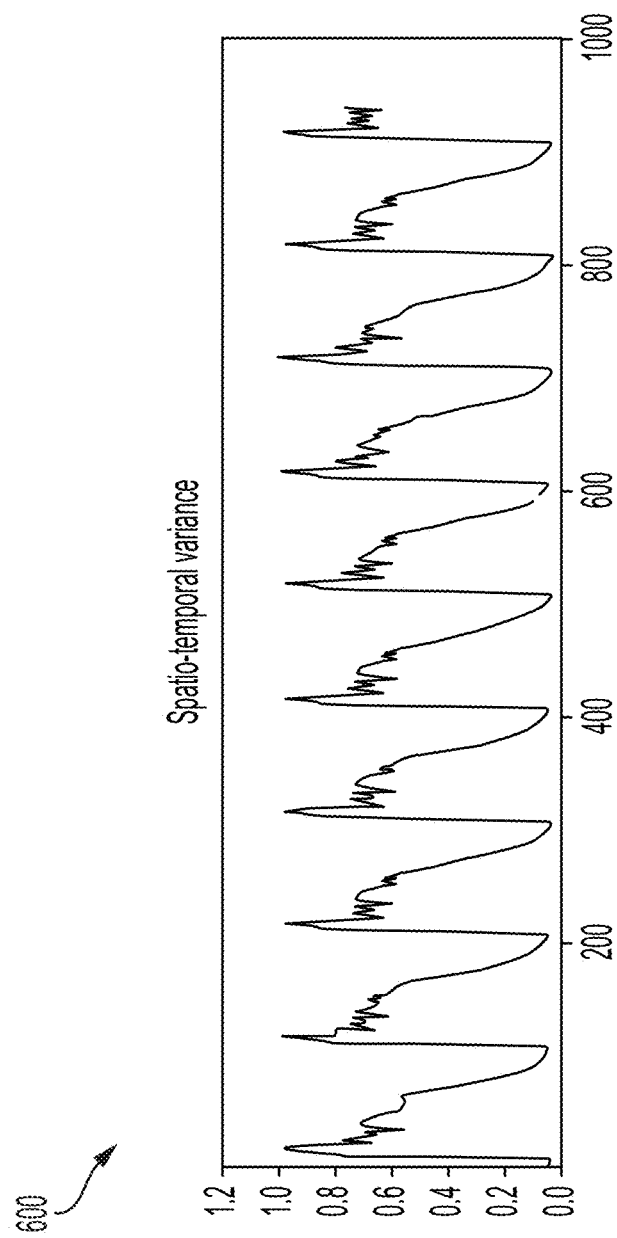
FIG. 6 depicts a graph of an example STV signal (i.e., waveform) over time at the location of the nozzle, according to an embodiment.

FIG. 6 depicts a graph 600 of an example STV signal (i.e., waveform) 610 over time at the location 115 of the nozzle 114, according to an embodiment. In the graph 600, the X axis represents the temporal frame index, and the Y axis represents the computed STV.

The method 300 may also include determining when the drops 124A-124E are jetted through the nozzle 114, as at 310. To accomplish this, one or more neighboring locations, proximate to the location 115 of the nozzle 114, may be searched, and the neighboring location with the largest STV may be determined to be the one through which the drops 124A-124EW pass after being jetted through the nozzle 114. Increases in the STV signal in this neighboring location 116 may identify the jetting of the drops 124A-124E (i.e., the drop ejections).

Figure 7:
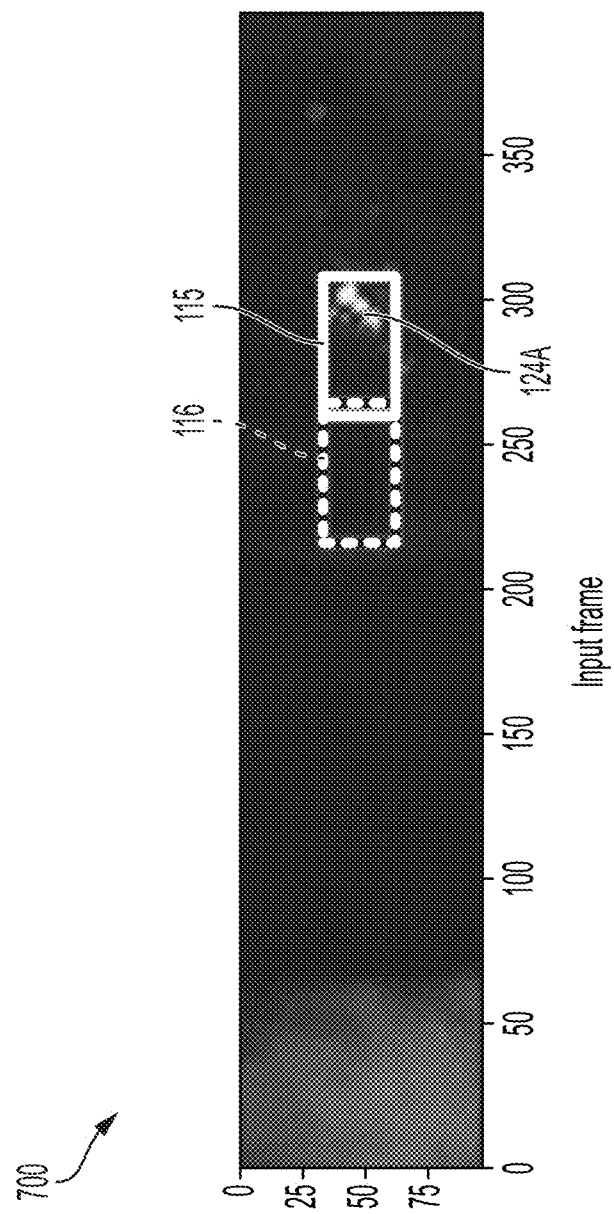
FIG. 7 depicts frame (e.g., an image) from the video, according to an embodiment.

FIG. 7 depicts a frame (e.g., an image) 700 from the video 500, according to an embodiment. In the image 700, the location 115 and the neighboring location 116 are shown. For example, in FIG. 7, the right side of the image 700 represents up, the left side of the image 700 represents down, and the drop 124A is moving from right/up to left/down. Referring to FIGS. 6 and 7, it may be seen that the meniscus 125 of the drop 124A reaches a predetermined (e.g., low) steady state level (i.e., a desirable level) before the next drop is jetted. As used herein, the predetermined steady state level is less than about 30%, less than about 20%, or less than about 10% of the maximum STV within the pulse period.

Figure 8:
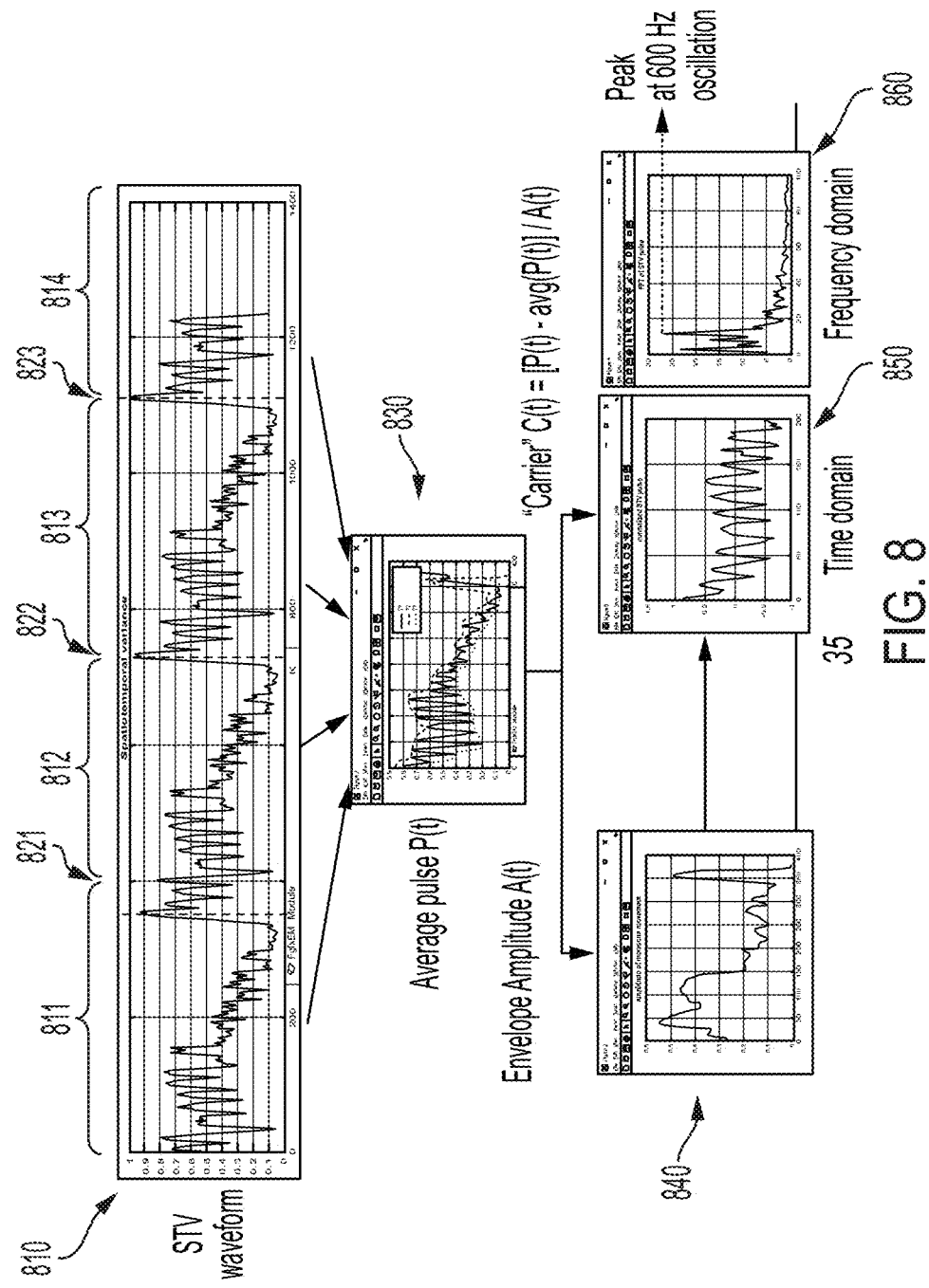
FIG. 8 illustrates a STV waveform, a pulse-averaged signal, an envelope amplitude signal, a meniscus carrier signal in the time domain, and a meniscus oscillation frequency in the frequency domain, according to an embodiment.

The method 300 may also include determining one or more metrics based at least partially upon the STV signal, as at 312. The metrics may be used to characterize the (e.g., aggregate) behavior of the meniscus 125 over the temporal duration of the video 500. Thus, determining the metrics may include determining pulse periods (four pulse periods are shown: 811-814) between times at which the drops 124A-124E are jetted (three times are shown 821-823), as at 314. This determination may be made based at least partially upon the STV signal. This is shown in the graph 810 in FIG. 8.

Determining the one or more metrics may also include generating a pulse-averaged signal (i.e., waveform) based at least partially upon the pulse periods, as at 316. The pulse-averaged signal is shown in the graph 830 in FIG. 8. Generating the pulse-averaged signal may include aligning the STV signal in the pulse periods 811-814 and/or averaging the STV signal in the pulse periods 811-814.

Determining the one or more metrics may also include generating an amplitude envelope A(t) based at least partially upon the pulse-averaged signal, as at 318. As used herein, the "amplitude envelope" refers to the difference between local maxima and local minima over a sliding temporal window. This envelope may yield information about the decay rate and time taken for the meniscus 125 to reach a "quiet" steady state. The amplitude envelope is shown in the graph 840 in FIG. 8. Generating the amplitude envelope may include moving a sliding temporal window over the pulse-averaged signal. The amplitude envelope may be a difference between local maxima and minima over the sliding temporal window. The amplitude envelope may yield information about an amount of time and/or a decay rate for the meniscus 125 to reach a quiet steady state.

Determining the one or more metrics may also include generating a meniscus carrier signal based at least partially upon the pulse-averaged signal (in graph 830) and the amplitude envelope (in graph 840), as at 320. The meniscus carrier signal is shown in the graph 850 in FIG. 8. Generating the meniscus carrier signal may include normalizing the pulse-averaged signal to zero mean to produce a normalized pulse-average signal, and then dividing the normalized pulse-average signal by the envelope amplitude. The meniscus carrier signal may be in the time domain.

Determining the one or more metrics may also include determining a meniscus oscillation frequency based at least partially upon the meniscus carrier signal, as at 322. The meniscus oscillation frequency is shown in the graph 860 in FIG. 8. The meniscus oscillation frequency may be determined by locating a peak in a Fourier Transform of the meniscus carrier signal. As shown in the graph 860, the peak amplitude occurs at about 600 Hz oscillation.

The method 300 may also include determining (e.g., characterizing) a behavior of the meniscus 125, as at 324. The behavior may be determined/characterized based at least partially upon the metrics (e.g., the characteristics of the pulse STV waveform). More particularly, the behavior may be determined/characterized based at least partially upon the pulse periods (in graph 810), the pulse-averaged signal (in graph 830), the envelope amplitude (in graph 840), the meniscus carrier signal (in graph 850), the meniscus oscillation frequency (in graph 860), or a combination thereof. In one embodiment, determining/characterizing may include quantifying the behavior of the meniscus 125. This may yield a more objective assessment of the meniscus 125 in comparison to conventional visual inspection of the video.

For example, the behavior of the meniscus may be determined to be optimal when the meniscus oscillation frequency (in graph 860) is in a first range, and the behavior of the meniscus may be determined to be sub-optimal when the meniscus oscillation frequency (in graph 860) is in a second range. The first range may be from about 500 Hz to about 2 kHz or from about 1 kHz to about 1.5 kHz. The second range may be above and/or below the first range. The oscillation may be a combination of transverse and surface waves.

In at least one embodiment, the method 300 may also include predicting jetting quality of the 3D printer 100, as at 326. The jetting quality may be predicted using a machine learning (ML) algorithm. The ML algorithm may be trained using features extracted from the video 500. The features may be or include the pulse periods (in graph 810), the pulse-averaged signal (in graph 830), the envelope amplitude (in graph 840), the meniscus carrier signal (in graph 850), the meniscus oscillation frequency (in graph 860), or a combination thereof. The features may also or instead include a principal component analysis (PCA) on the pulse-averaged signal (in graph 830), a carrier frequency of the STV signal, a pulse-to-pulse covariance of the STV signal, a pulse-to-pulse correlation of the STV signal, a mean and/or max of the pulse-averaged signal (in graph 830), a decay of the STV signal within each pulse period 811-814, or a combination thereof. The ML algorithm may also be trained by labeling ground truths that indicate the quality of jetting. The ground truths may be labelled by a user. In one example, three quality labels may be used: good, overactive, and hyperactive. As used in this context, "good" refers to the meniscus amplitude decaying monotonically between pulses, and the behavior is repeatable from pulse to pulse, "overactive" refers to the meniscus oscillation having a high amplitude in between pulses, and the behavior is generally repeatable from pulse to pulse, and "hyperactive" refers to the meniscus oscillation having a high amplitude in between pulses, and the behavior is not repeatable from pulse to pulse.

In one embodiment, the features and quality labels from the training set are provided to a Random Forest (RF) classifier to predict a quality class. In one example, a "quality class" refers to one of good, overactive, and hyperactive. The RF classifier may include a plurality of trees (e.g., 300 trees). A test configuration that provided good results used the following features: the carrier frequency of the STV signal, the pulse-to-pulse covariance of the STV signal, the mean and/or max of the pulse-averaged signal (in graph 830), and the decay of the STV signal within each pulse period 811-814. This resulted in a prediction accuracy of 86% on one test. It was observed that confusion was greatest between "good" and "overactive" classes.

In one embodiment, the method 300 may also include predicting a stability of the drops 124A-124E, as at 328. Drop stability refers to the consistency between drops 124A-124E in a continuous jetting mode. Drop stability may be quantified on a scale from 1 (poor) to 4 (excellent) (e.g., based on visual assessment of strobe videos of the drops 124A-124E). The RF classifier may be trained using one or more of features mentioned above that are used to train the ML algorithm. In one test, using a random forest classifier with 100 trees, a prediction accuracy of 60% was achieved.

The steps 326, 328 may also or instead use other variants of ML algorithms (e.g., support vector machine, artificial neural network, etc.) and/or additional features (e.g., autocorrelation of waveform, and features automatically learned from the data using a deep neural network).

The method 300 may also include adjusting one or more parameters of the 3D printer 100, as at 330. The parameters may be adjusted based at least partially upon the one or more metrics (e.g., the pulse periods (in graph 810), the pulse-averaged signal (in graph 830), the envelope amplitude (in graph 840), the meniscus carrier signal (in graph 850), the meniscus oscillation frequency (in graph 860), or a combination thereof). For example, the one or more parameters may be adjusted in response to the meniscus oscillation frequency being greater than a predetermined threshold (e.g., 1.5 kHz). In another example, the one or more parameters may be adjusted in response to a decay rate of the meniscus oscillation frequency being greater than or less than a predetermined rate.

The parameters to be adjusted may be or include power (e.g., voltage, current, frequency, pulse length, voltage vs time waveform, etc.) provided to the coils 134 by the power source 132. For example, if the behavior of the meniscus 125 is determined (at 324) to be overdriven, the power delivered to the coils 134 may be decreased. As used herein, "overdriven" means excess energy is being added to the liquid metal 122 in the ejector 110, which results in excess residual energy in the meniscus 125. The parameters may also or instead include the amount of heat generated by the heating elements 130, the temperature of the liquid printing material 120 (e.g., the drops 124A-124E), the size of the drops 124A-124E, the frequency at which the drops 124A-124E are ejected, or a combination thereof.

Characterizing Liquid Reflective Surfaces in 3D Liquid Metal Printing

The present disclosure is directed to determining the behavior (e.g., shape and/or motion) of a liquid reflective surface of a drop of liquid metal over time by receiving a partially informative image of the surface recorded by an optical camera, and predicting a parametric description of the surface based at least partially upon the partially informative image. This technique may be used to analyze certain classes of difficult problems such as recovery of a shape from specular reflections off of a liquid surface (e.g., a liquid metal drop). The temporal recovery of a liquid shape from optical images and/or video may then be used to measure the speed of surface waves, the damping rate of the surface waves, the wavelength of the surface waves, or a combination thereof. With additional modeling effort, the measurements of the waves may then be used to determine the liquid's intrinsic physical properties, such as surface tension, viscosity, density, or a combination thereof.

For certain physical setups (e.g., including extremely hot fluids such as liquid metals, highly reactive fluids, physically inaccessible fluids, etc.), this contactless measurement may be the only method to measure the fluid physical properties. The problem of shape recovery of reflective fluid using video and/or images is challenging because optical sensors and lights often need to be located at an acute angle with respect to the fluid surface normal. The resulting images may thus provide only sparse information about the interface shape (e.g., via just specular highlights). The image processing and computer vision techniques then incorporate physical constraints to regularize the ill-posed problem of surface recovery. The fluid interface can change shape at a millisecond time scale. A high-speed camera may be used to detect the fast oscillations.

The behavior of the liquid metal (e.g., the meniscus 125 of the drop 124A) at least partially in the nozzle 114, between drop ejections, has an effect on the quality of jetting, and ultimately on the quality of the 3D object 126. In order for the jetted drops 124A-124E to be consistent in form and motion, the meniscus oscillation after one jetting should decay rapidly and acquiesce completely before the next drop is jetted. In one embodiment, the meniscus behavior may be characterized by capturing high-speed videos and/or images of the nozzle 114 and/or the liquid metal (e.g., the drop 124A) therein during printing, and performing visual assessment of the surface behavior of the liquid metal between jettings. In another embodiment, the meniscus 125 may be automatically characterized and quantified using 3D liquid surface modeling, video analysis, and/or machine learning (ML) applied to the high-speed videos. Such quantification can be used in both open system design and optimization (e.g., nozzle design and selection), as well as closed-loop controls. The problem is difficult because the drops 124A-124E are microns in diameter, the drops 124A-124E are formed deep in a shrouded nozzle 114 that preserves a gas field, the surfaces of the drops 124A-124E are highly specular, and the lighting options are limited. Although the following description is provided in the context of the 3D liquid metal printer 100, it can also or instead be used to characterize motion and surfaces of other physical phenomena such as Faraday waves on the surface of a liquid, as described below.

FIGS. 3-8 and the corresponding portion of the Detailed Description above are directed to characterizing meniscus activity via a STV measure applied to the videos (or images). That method 300 may provide an approximate predictor of meniscus oscillation, but it may not be able to predict the 3D meniscus shape and/or amplitude of the oscillation. The following portion of the Detailed Description builds upon the method 300 and is able to predict the 3D meniscus shape and/or amplitude of the oscillation.

More particularly, the following portion of the Detailed Description may fit complex patterns of specular highlights to a parametric model, thus offering a more complete characterization, including estimation of maximal displacement from the nozzle plane as well as the different modes of oscillation. The use of an underlying parametric model for the meniscus surface shape injects a structural prior that helps to compensate for the sparse information available from observing specular highlights from the drops 124A-124E.

While capturing video of the liquid metal jetting process, the camera 140 and light source 150 may be positioned at a fixed geometry relative to a central (e.g., vertical) longitudinal axis through the nozzle 114. The nozzle 114 is therefore at a fixed location within the video frames (e.g., images), and can thus be cropped to focus on just the oscillation of the liquid metal in the nozzle 114 (e.g., the drops 124A-124E).

As described in greater detail below, characterizing the liquid reflective surfaces of the drops 124A-124E in the nozzle 114 may include defining a parametric model for the surface of the drops 124A-124E. The surface of the drops 124A-124E may also or instead be referred to as the membrane surface or meniscus 125. A graphic simulator may then synthesize individual images or videos of the liquid metal (e.g., the meniscus 125 of the drops 124A-124E) in the nozzle 114 with the model, and camera/lighting/nozzle geometry that closely mimics a real (i.e., actual; not simulated) experimental setup. A labeled dataset of meniscus videos and corresponding membrane parameter values may then be generated (e.g., using a graphics simulator). The labeled dataset may be used to create an inverse mapping from real video frames to membrane surface parameters. This may be accomplished via an artificial neural network (ANN) and/or direct nearest-neighbor search. The inverse mapping may enable reconstruction of the spatiotemporal meniscus surface profile. Metrics may then be extracted from the reconstructed surface. The metrics may be or include carrier oscillation frequency, maximum envelope magnitude, envelope decay rate, or a combination thereof. The metrics may be used to perform an open loop system design, identification, and diagnostics (e.g., comparing predicted parameters to a reference and using the difference for understanding changes in pump dynamics, meniscus vibration modes, etc.) Additionally or alternately, the metrics may be used to perform real-time closed-loop controls for the 3D printer 100 to maintain high-quality jetting. Relating the model parameters to control knobs (e.g., voltage, pulse width, pump temperature, height of melt pool, etc.) may enable control of the meniscus 125 of the drops 124A-124E in the nozzle 114 while delivering target drop mass and target drop velocity.

The assumption of the fixed location of the nozzle 114 may be relaxed by using methods to locate the nozzle 114 in the videos and/or images (e.g., using spatial temporal variance). Alternatively, a method based on artificial neural networks (ANNs) may be made invariant to the location of the nozzle 114 using convolutional methods that are translation invariant.

Figure 9:
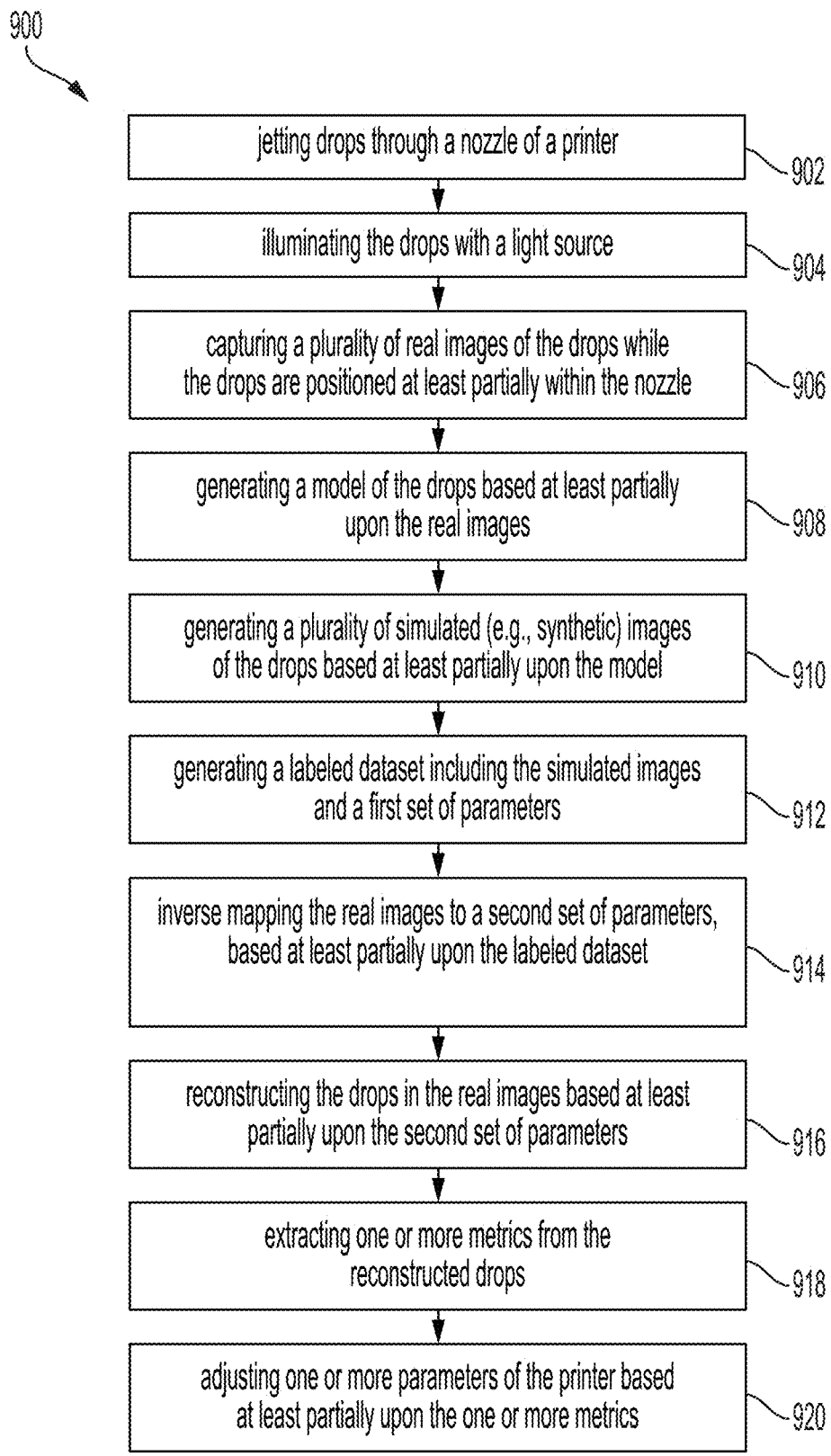
FIG. 9 depicts a flowchart of a method for printing the 3D object, according to an embodiment.

FIG. 9 depicts a flowchart of a method 900 for printing the 3D object 126, according to an embodiment. More particularly, the method 900 may characterize liquid reflective surface(s) of the meniscus 125 of the liquid printing material 120 (e.g., the drop 124A) when the drop 124A is positioned at least partially within the nozzle 114.

The method 900 is particularly applicable to liquid metal drops 124A-124E in 3D printing applications (as opposed to non-metal drops and/or non 3D printing applications) because metallic drops produce specular highlights, and analysis of these specular highlights provided by the method 900 may provide information and insight into the oscillation of the liquid metal surface (e.g., the meniscus 125) of the drop 124A. The behavior (e.g., oscillation) of the meniscus 125 may be directly related to the stability of the drop 124A, which in turn affects the quality of the 3D object 126. In addition, the stability of the meniscus 125 of the liquid metal is directly tied to drop coherence and mass/velocity standardization over time, which is directly tied to the quality of the 3D object 126.

In addition, based upon the frequency of oscillation of the meniscus, a user may extract material properties, such as the true magnitude and effect of the surface tension between the liquid metal and the gas (e.g., atmosphere), or liquid metal viscosity. Alloy and other molten metals that measure alloy material properties are not currently in practice applicable in 3D printing. Static material in pure environments may be temperature dependent. In real-world applications (e.g., 3D printing), alloy material may suffer from inherent impurities, either by construction or after they interact with atmosphere (e.g., oxygen), and develop oxide layers on the surfaces (e.g., meniscus). This may alter the surface tension and/or viscosity parameters. This, in turn, may affect not only modelling efforts but also the mechanical and other quality properties of the printed parts.

An illustrative order of the method 900 is provided below; however, one or more steps of the method 900 may be performed in a different order, performed simultaneously, repeated, or omitted. One or more steps of the method 900 may be performed (e.g., automatically) by the computing system 190.

The method 900 may include jetting the drops 124A-124E through the nozzle 114 of the printer 100, as at 902. The drops 124A-124E may be jetted at a predetermined frequency (e.g., from about 100 Hz to about 1000 Hz or about 200 Hz to about 500 Hz).

The method 900 may include illuminating the drops 124A-124E with the light source 150, as at 904. This may include illuminating the liquid printing material 120 (e.g., the drops 124A-124E) when the liquid printing material 120 is positioned at least partially within the nozzle 114. More particularly, this may include illuminating the meniscus 125 of each drop 124A-124E when the drop 124A-124E is positioned at least partially within the nozzle 114. This may also or instead include illuminating the drops 124A-124E as the drops 124A-124E descend from the nozzle 114 toward the substrate 160.

The method 900 may also include capturing a plurality of images of the drops 124A-124E, as at 906. This may include capturing real images of the liquid printing material 120 (e.g., the drops 124A-124E) when the liquid printing material 120 is positioned at least partially within the nozzle 114. More particularly, this may include capturing images of the meniscus 125 of each drop 124A-124E when the drop 124A-124E is positioned at least partially within the nozzle 114. This may also or instead include capturing images of the drops 124A-124E as the drops 124A-124E descend from the nozzle 114 toward the substrate 160. The images may be captured while the drops 124A-124E are illuminated. In another embodiment, this step may also or instead include capturing a video of the liquid printing material 120 (e.g., drops 124A-124E). The images may be frames of the video.

The method 900 may also include generating a model of the drops 124A-124E, as at 908. The model may be based at least partially upon the images (or video). Thus, the model may be based at least partially upon the drops 124A-124E when the drops 124A-124E are positioned at least partially within the nozzle 114. More particularly, the model may be based at least partially upon the meniscus 125 of the drops 124A-124E when the drops 124A-124E are positioned at least partially within the nozzle 114. In other words, the model may be based at least partially upon the membrane surface (e.g., of the meniscus 125) of the drops 124A-124E. In one example, the model may be or include a parametric model of the meniscus 125 of the drops 124A-124E.

The nozzle 114 may be circular with radius R. After one drop (e.g., drop 124B) is jetted, the meniscus 125 of the liquid printing material 120 (e.g., the next drop 124A) in the nozzle 114 oscillates before reaching a steady-state shape defined by the hydrostatic pressure. Surface tension and inertia may define the oscillation modes, while viscosity may define the temporal decay of the amplitude of the motion. Drop breakup may define the amplitude of the modes. Meniscus net motion may be considered negligible because the meniscus 125 is pinned by a sharp change in the contact angle.

The high-fidelity parametric model of the meniscus motion may include incompressible Naiver-Stokes equations with free surface boundary conditions. Setting different initial conditions, different dynamics of the meniscus oscillations may be obtained. A high-fidelity model may not be feasible for routine monitoring due to the high computational cost. A reduced-order model may be used to parametrize meniscus motion in a computationally efficient fashion. To reduce the model order, the meniscus 125 may be modeled as an elastic damped circular membrane under a constant load. The analogy with the meniscus 125 is based on the surface tension acting as a force that brings the meniscus 125 to the steady-state shape. The solution of the elastic damped circular membrane under constant load may include two (e.g., quadratic) terms. The first term describes the steady-state shape of the membrane. The second term is the linear combination of the membrane's oscillation modes multiplied by the exponential dumping. The Bessel functions describe the oscillation modes:

$$D(r, t) = d + \left[pR - \frac{p}{R}r^2\right] + \\ e^{-\gamma_1 t}\sin(\omega_1 t)\left[aRJ_0\left(2.4048\frac{r}{R}\right)\right] + e^{-\gamma_2 t}\sin(\omega_2 t)\left[bRJ_0\left(5.52\frac{r}{R}\right)\right] \quad (1)$$

Figure 10:
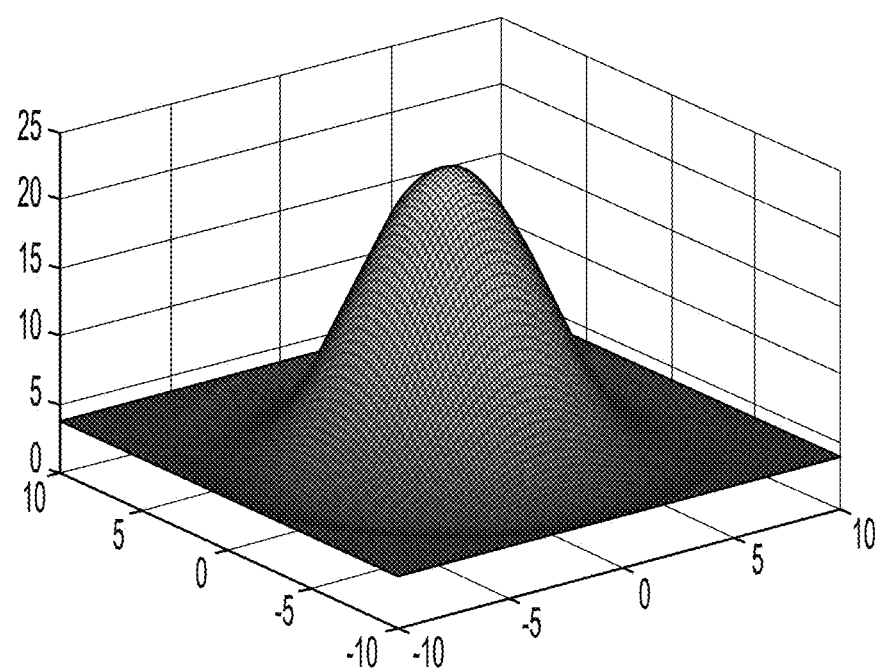
FIG. 10 depicts a graph of D(r,t) as a function of spatial coordinates at a fixed time instance, and for selected parameter values, according to an embodiment.

In Equation 1, $0 \leq r \leq R$ is the radial distance from the center of the nozzle 114, t indicates time, $J_0()$ is the zero-th order Bessel function, $\omega_1$ and $\omega_2$ determine sinusoidal oscillation frequency, $\lambda_1$, $\lambda_2$ are exponential decay constants, d is a constant offset and p represents the steady state shape of the meniscus 125 at rest. The first term in parenthesis denotes steady state behavior (e.g., for large t) when the drop surface completely acquiesces. Parameters a and b determine the relative weights of the two Bessel functions. In one embodiment, D(r,t) is circularly symmetric, although non-symmetric generalizations are also possible. The model may also be based at least partially upon a first set of parameters from Equation (1). Given the first set of parameters (e.g., a, b, $\omega_1$, $\omega_2$, $\lambda_1$, $\lambda_2$), the model may enable a complete spatiotemporal description of the meniscus surface D(r,t). FIG. 10 depicts a graph of D(r,t) as a function of spatial coordinates at a fixed time instance, and for selected parameter values, according to an embodiment. Another profile is the maximum meniscus displacement (e.g., achieved at r=0) as a function of time. From Equation (1), this is a sum of two sinusoids with exponentially decaying magnitudes.

The method 900 may also include generating a plurality of simulated (e.g., synthetic) images of the drops 124A-124E, as at 910. More particularly, this step may include generating a plurality of simulated images (or simulated video) of the meniscus 125 of the liquid printing material 120 (e.g., drops 124A-124E) at least partially in the nozzle 114 based at least partially upon the model using a 3D rendering program. The simulated images (or simulated video) may include simulated drops 124A-124E, each having a simulated meniscus 125. In one embodiment, a cycles ray tracing engine may be used to simulate the images (or video); however, other photorealistic renderers may also be used.

First, the 3D surface of the meniscus may be modeled according to Equation (1), with the surface defined as a finely triangulated mesh. Reflection properties of the meniscus of the simulated drops may be selected to closely mimic the real (e.g., liquid metal) drops 124A-124E. Next, a single simulated collimated light source may illuminate the simulated drops, and a simulated video camera may capture simulated video and/or images of the nozzle and/or the drops in the nozzle. The geometry (e.g., positioning and/or pose) of the simulated camera and simulated light source and are selected based on measurements of the geometry of the real camera 140 and real light source 150 used to capture the real videos (e.g., at 906). To capture edge effects, the edges of the meniscus protruding from (or receding into) the nozzle may be simulated. Additional effects (e.g., image blur, additive noise, secondary reflections from sputter in the vicinity of the nozzle, a fixed bias on the surface profile (constant d in Equation 1), etc.) may be incorporated into the Blender simulation to improve the match in appearance between the real and simulated videos. FIGS. 11A-11C depict simulated images of the meniscus, according to an embodiment. More particularly, FIG. 11A depicts an axis-symmetric triangular mesh of the simulated meniscus, FIG. 11B depicts a 3D solid rendering of the simulated meniscus showing edges protruding past the nozzle by a small amount, and FIG. 11C depicts a rendering of the simulated meniscus showing sparse specular highlights on the metallic drop surface.

Figure 12A:
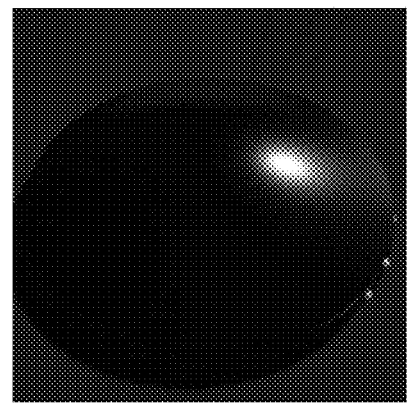
FIG. 12A depicts a synthetic representation of a moving surface of the meniscus pinched in the nozzle, illuminated with an artificial source of light, according to an embodiment.
Figure 12B:
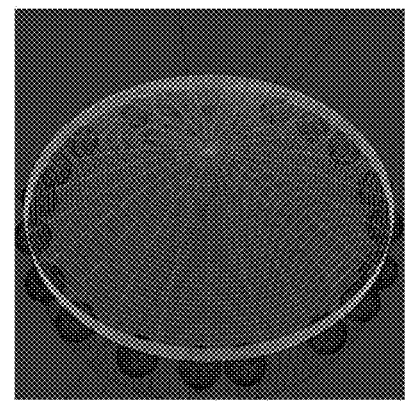
FIG. 12B depicts a spatial discretization of a mathematical model of membrane surface before illumination, according to an embodiment.
Figure 12C:
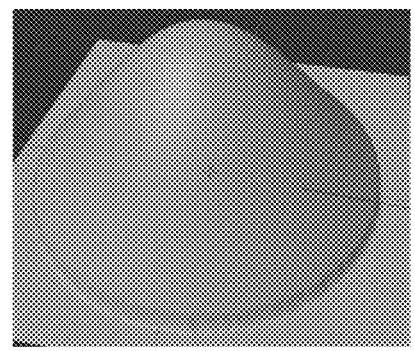
FIG. 12C depicts a reconstructed meniscus surface in a completely illuminated environment, according to an embodiment.
Figure 12D:
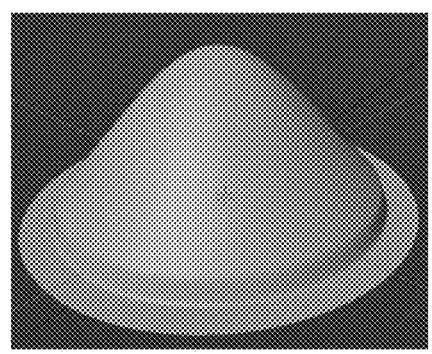
FIG. 12D depicts the pinching step of the meniscus surface, where the boundary is fixed on the tip of the nozzle, according to an embodiment.

In one embodiment, a radial mesh may result in fewer artifacts at the boundary of the mesh and/or the surface. FIG. 12A depicts a synthetic representation of a moving surface of the meniscus pinched in the nozzle, illuminated with an artificial source of light, according to an embodiment. FIG. 12B depicts a spatial discretization of a mathematical model of membrane surface before illumination, according to an embodiment. FIG. 12C depicts a reconstructed meniscus surface in a completely illuminated environment, according to an embodiment. FIG. 12D depicts the pinching step of the meniscus surface, where the boundary is fixed on the tip of the nozzle, according to an embodiment.

Figure 13A:
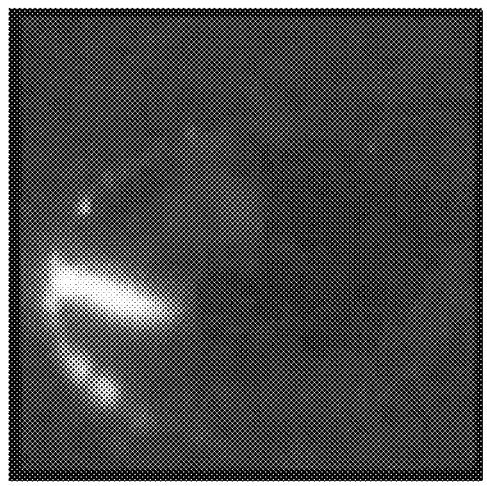
FIG. 13A depicts a real image of the drop.
Figure 13B:
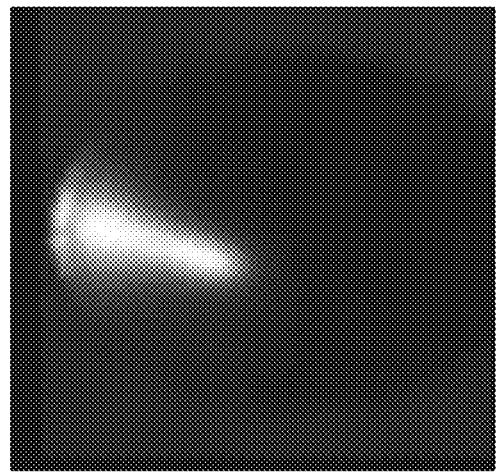
FIG. 13B depicts a corresponding simulated image of the drop, according to an embodiment.

FIG. 13A depicts a real image (e.g., from 906) of the drop 124A, and FIG. 13B depicts a corresponding simulated image (e.g., from 910) of the drop 124A, according to an embodiment. The image in FIG. 12A may be or include a frame from the real video (e.g., from 906), and the image in FIG. 12B may be a frame from the simulated video (e.g., from 910). As may be seen, the correspondence between the real image and the simulated image may be quite good. The highlights in the images may provide only sparse information about certain areas on the surface of the drop 124A. The parametric equations may provide information about the parts of the drop 124A that are not highlighted.

The method 900 may also include generating a labeled dataset including the simulated images of the drops 124A-124E and a first set of parameters, as at 912. This may produce a dataset of labeled simulated images of the drops 124A-124E, including the menisci. The simulated images may be labelled with the first set of parameters. (e.g., a, b, $\omega_1$, $\omega_2$, $\lambda_1$, $\lambda_2$, p, d, or a combination thereof) using the graphics simulator. The first set of parameters may also be referred to as membrane parameter values.

More particularly, a Blender simulation may be used to generate a large dataset of simulated images with known model parameter values (i.e., the first set of parameters). The images may be tightly cropped around the nozzle region. In one embodiment, static image snapshots of the surface of the meniscus may be generated without explicit definition of the temporal dimension. In this case, Equation 1 may be rewritten, absorbing the temporal (e.g., sinusoidal and/or exponential) dependencies into coefficients a and b. This allows the problem to be modeled to predict the meniscus from single time frames. This may reduce the dimensionality of the problem, as there are many fewer individual "frames" than there are sequences. The frame equation is:

$$D(r) = d + \left[pR - \frac{p}{R}r^2\right] + aRJ_0\left(2.4048\frac{r}{R}\right) + bRJ_0\left(5.52\frac{r}{R}\right) \quad (2)$$

Figure 14A:
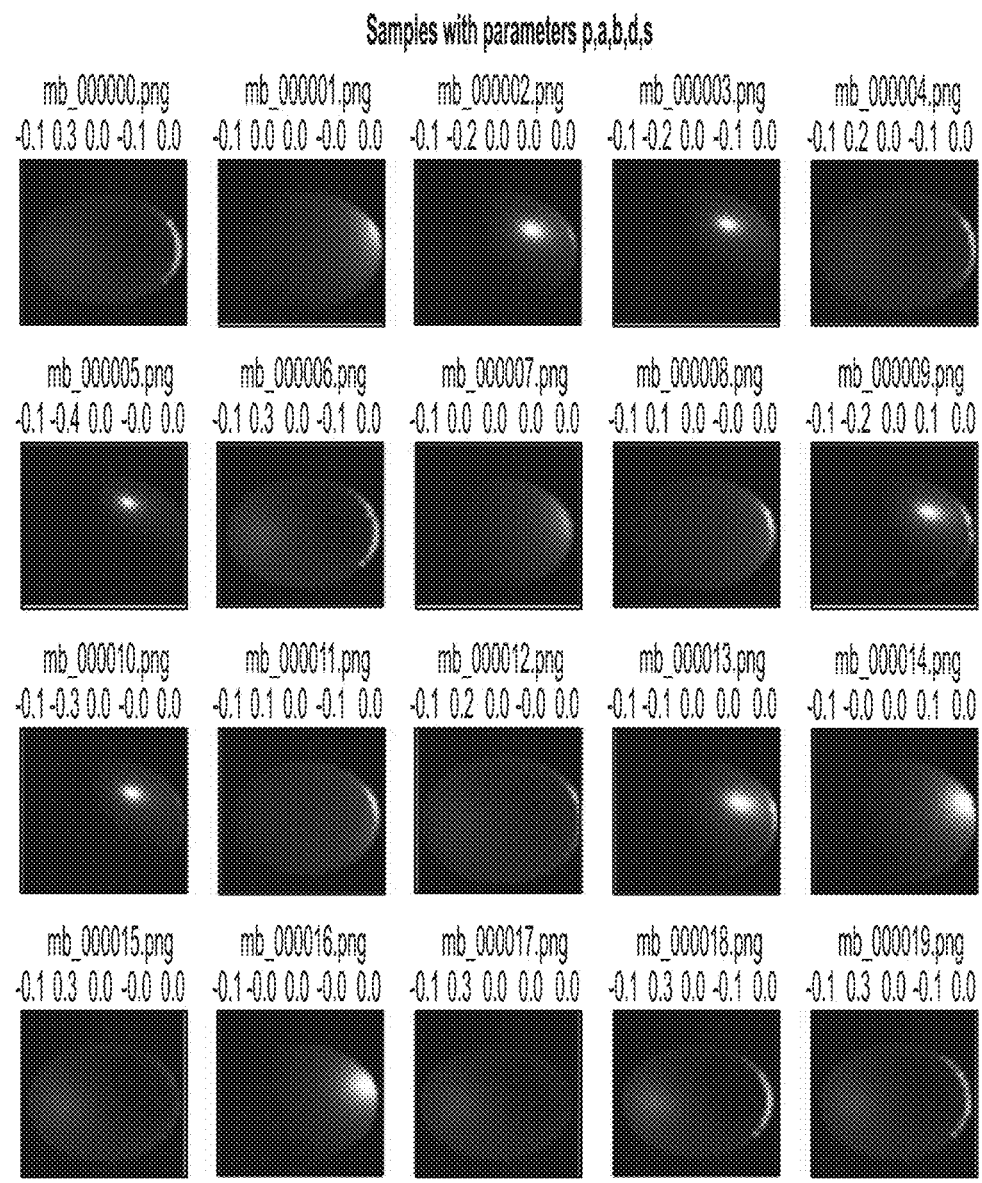
FIGS. 14A-14C depict a plurality of labeled simulated images (e.g., video frames) of the simulated drop with various parameter values, according to an embodiment.
Figure 14B:
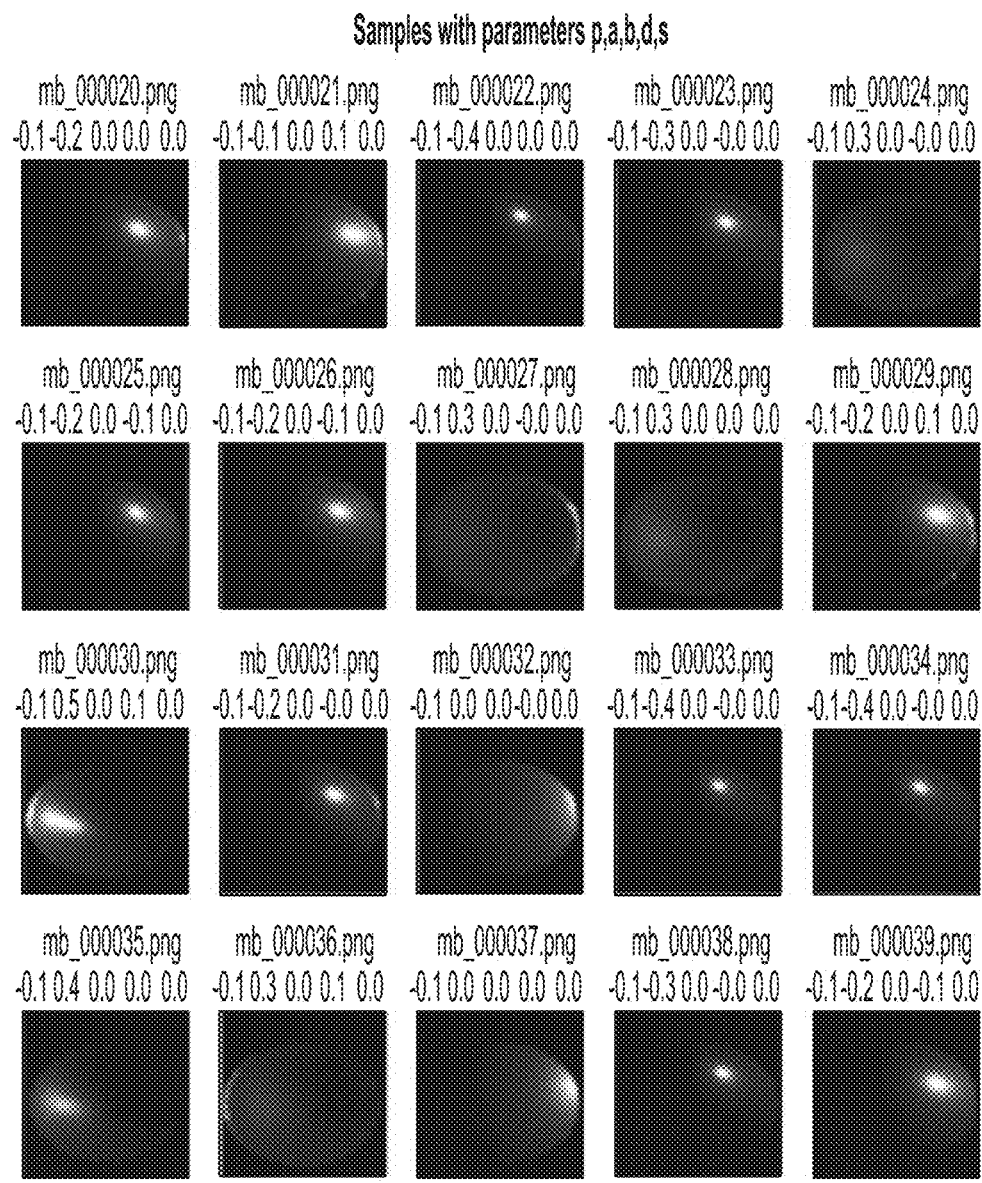
Figure 14C:
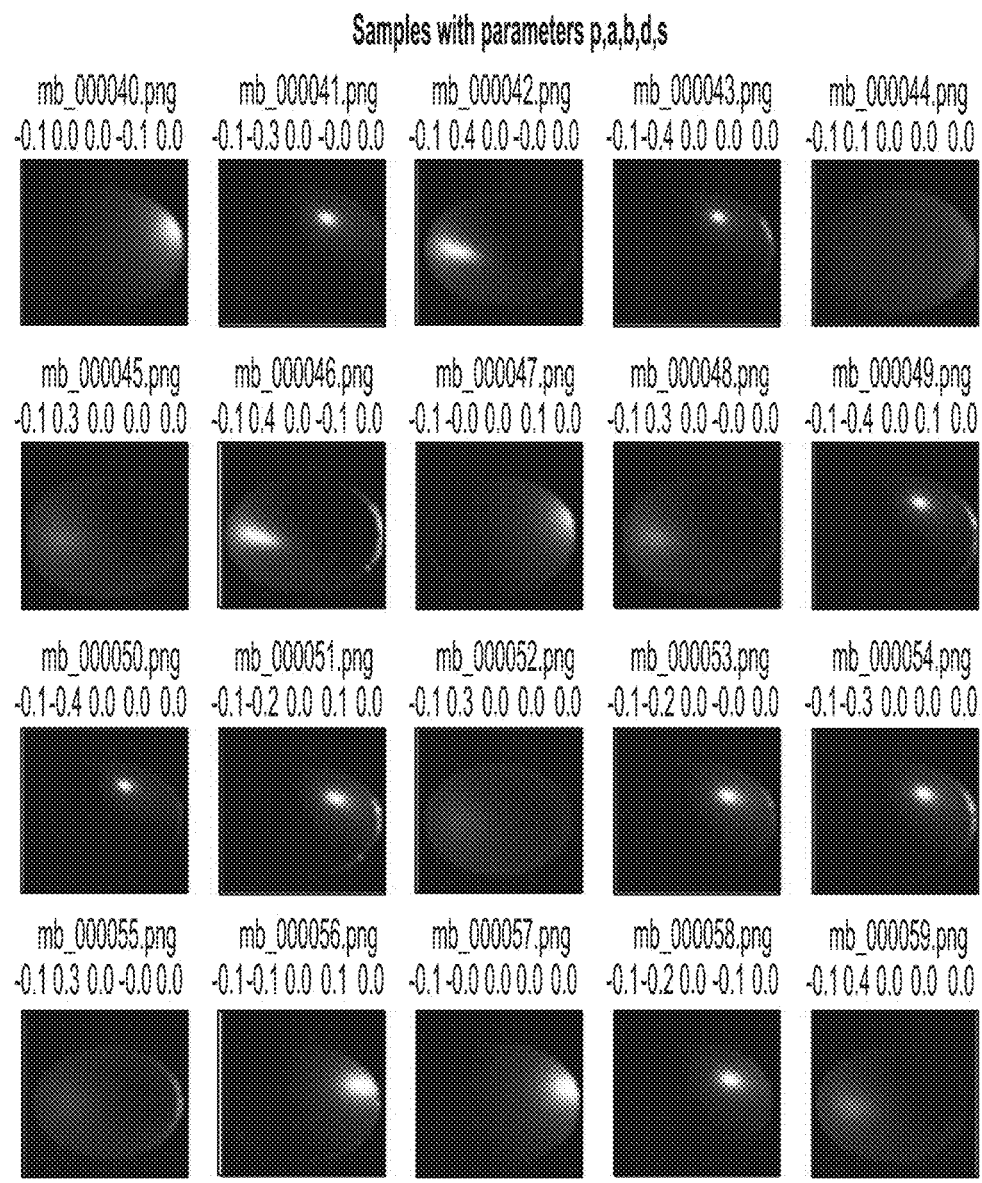

The following ranges may be used for the first set of parameters: 0≤p≤0.2; −0.5≤a≤0.5; −0.1≤b≤0.1; −1≤d≤1. The parameters p, a, b, d, or a combination thereof may be varied within their ranges to produce plausible 3D surface profiles. A small amount or perturbation may be applied to the camera and light angles to increase robustness. A relatively small number of labeled simulated images (e.g., 10,000) may sufficiently cover the space of possible membranes well and lead to good recovery of membrane shape. FIGS. 14A-14C depict a plurality of labeled simulated images (e.g., video frames) of the simulated drop 124A with various parameter values, according to an embodiment.

The method 900 may also include inverse mapping the images (from 906) to a second set of parameters, as at 914. The second set of parameters may also be referred to as membrane surface parameters. The images (or video) may be inverse mapped based at least partially upon the labeled dataset (from 912). The images may be inverse mapped using an artificial neural network (ANN) and/or a direct nearest-neighbor search. The inverse mapping enables reconstruction of the meniscus 125 (e.g., the spatiotemporal meniscus surface profile) of the liquid printing material 120 (e.g., the drop 124A) at least partially in the nozzle 114.

In a first embodiment of step 914, the ANN may be trained using the labeled dataset to predict one or more of the surface parameters (e.g., [p, a, b]). These parameters may then be used to reconstruct the surface DO of the meniscus 125, and the rendered reconstruction may be compared against frames from the original video (from 906). One advantage of this approach is that the ANN executes the inverse mapping in a fast and efficient manner without requiring an optimization or search, thus making it applicable for real time closed-loop controls.

Figures 15A, 15B:
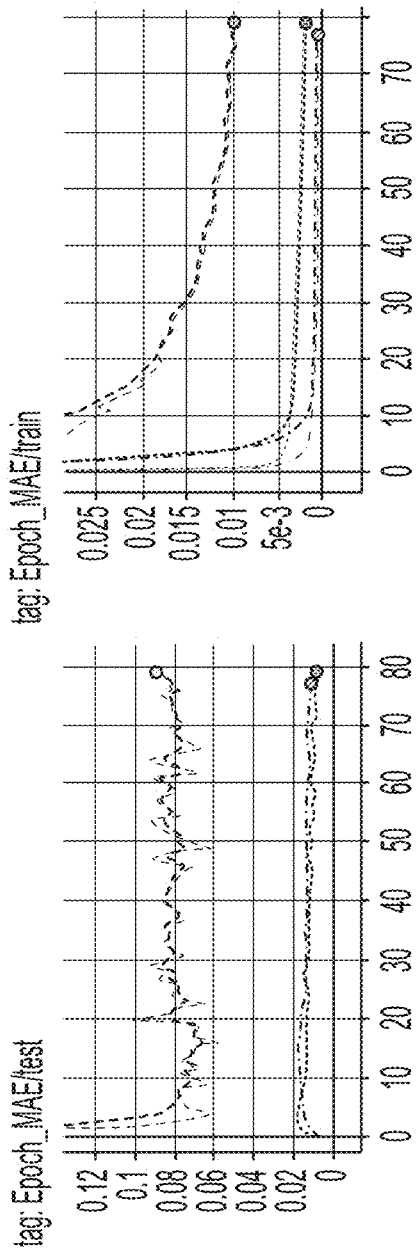
FIG. 15A depicts a graph showing the training error.
FIG. 15B depicts a graph showing the validation error, according to an embodiment.

In an example, the nozzle 114 may appear small in the original video (from 906). As a result, the input may be a 60×60 gray-scale image. This implies that a fairly simple network can adequately characterize possible membranes. The network may have a structure including 4 convolutional layers followed by 2 fully connected layers to directly regress membrane parameters:

64 channel 2D convolution, batchnorm, ELU
64 channel 2D convolution, batchnorm, ELU, MaxPool (kernel=2)
64 channel 2D convolution, batchnorm, ELU
64 channel 2D convolution, batchnorm, ELU, MaxPool (kernel=2)
256 channel fully connected
Dropout
256 channel fully connected to num_parameter_outputs Results fitting the model (from 908) to the synthetic images with known parameters (from 912) show the network has adequate capacity, as training error is very low. In an example, after 80 epochs of training, the mean average error (MAE) between the actual parameters and the estimated parameters was 0.0006 on training data and 0.0101 on the validation set. FIG. 15A depicts a graph showing the training error, and FIG. 15B depicts a graph showing the validation error, according to an embodiment.

Figure 16:
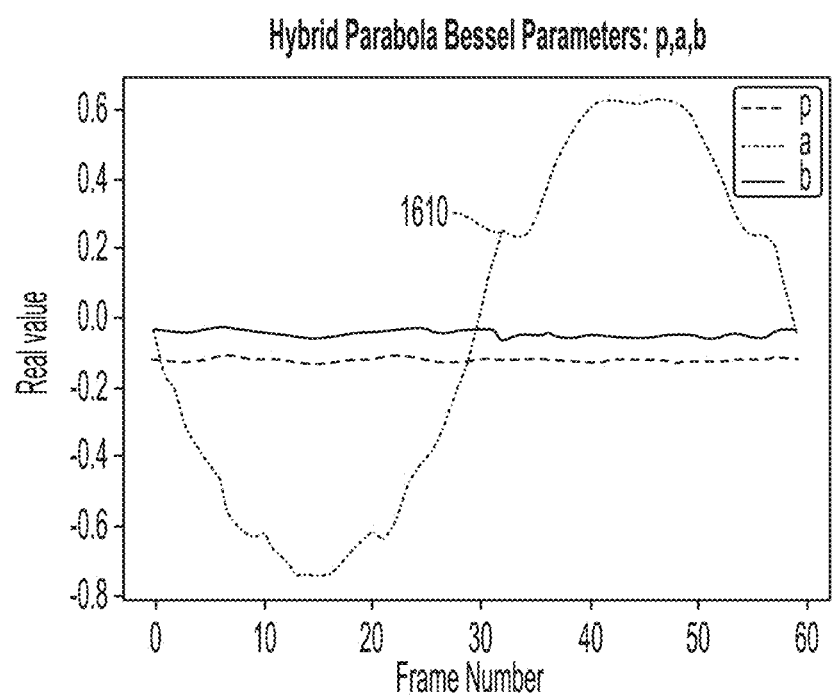
FIG. 16 depicts a graph showing parameters, according to an embodiment.

The inference was tested on a single period of a sinusoidal wave with known amplitude, phase, and frequency. The parameters that are inferred track a sinusoidal curve with some error. FIG. 16 depicts a graph showing the parameters [p, a, b], according to an embodiment. The curve 1610 tracks the amplitude of the first Bessel component "a," which is the dominant term representing flexure of the meniscus.

Figure 17:
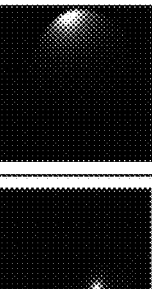
FIG. 17 depicts a comparison of images rendered from known sinusoidal waveforms and images rendered from inferred parameters, according to an embodiment.

Once the parameters have been inferred, the inferred parameters may be plugged back into the rendering engine to compare the inferred output with the original synthetic image, as shown in FIG. 17. More particularly, FIG. 17 depicts a comparison of images rendered from known sinusoidal waveforms and images rendered from inferred parameters, according to an embodiment.

One problem is inferring parameters from real video rather than synthesized video. FIG. 18 shows how the method 900 can recover parameters for individual frames of real video. More particularly, FIG. 18 depicts a parameter inference from individual frames of real video together with re-renderings of parameters, according to an embodiment. Small errors in parameter inference may result in significant changes in the rendered output unscoring the difficulty of this problem.

Figure 19A:
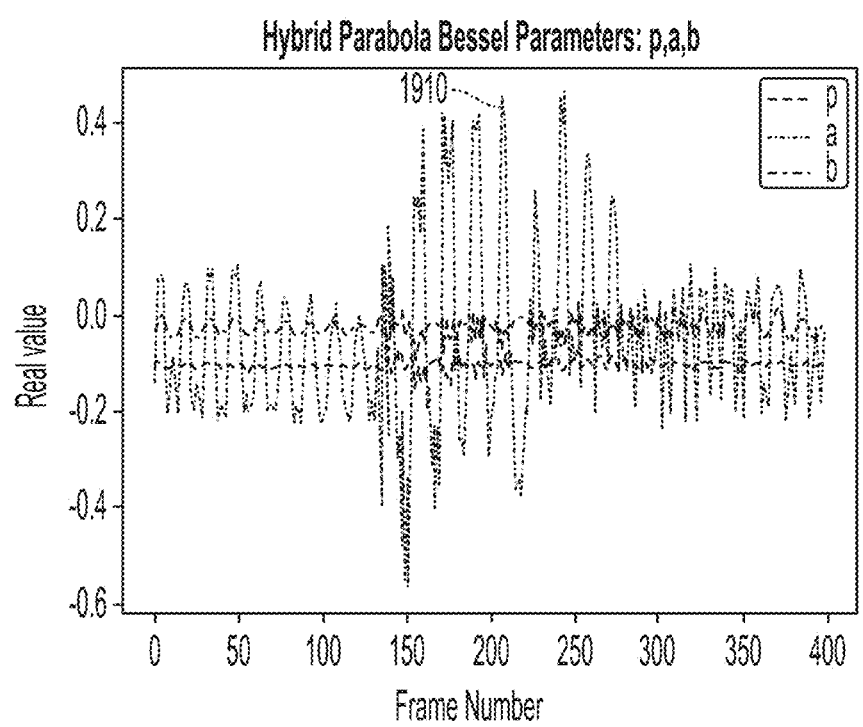
FIG. 19A depicts a graph showing the inference of membrane parameters from a real video.
Figure 19B:
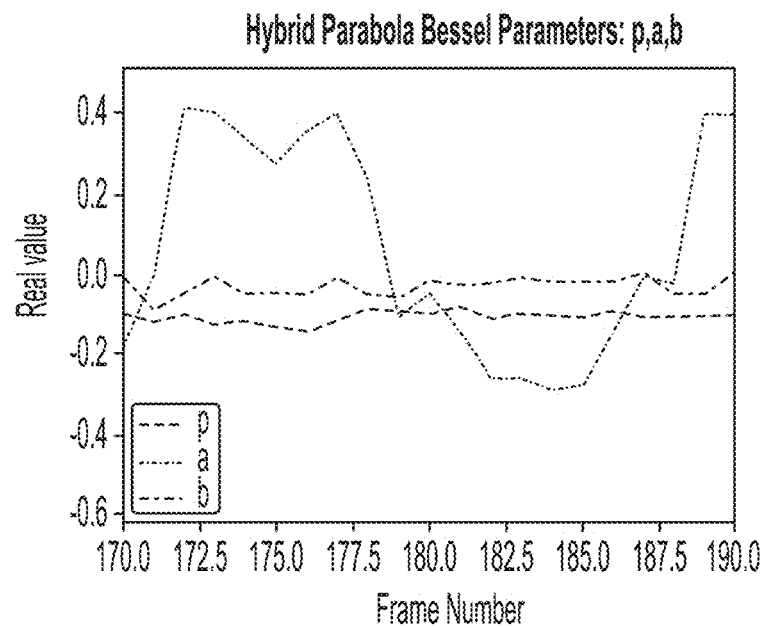
FIG. 19B depicts a magnified view of a single oscillation of FIG. 19A, according to an embodiment.

Despite errors in individual frame inference, the overall sequence reveals qualitative structure that aligns well with visual inspection of the real videos. FIG. 19A depicts a graph showing the inference of membrane parameters from a real video, and FIG. 19B shows a magnified view of a single oscillation of FIG. 19A, according to an embodiment. The periodic oscillation pattern and decay may be clearly seen in FIGS. 19A and 19B. The trace 1910 corresponding to parameter 'a' represents the first Bessel component, which is the dominant driver of membrane shape. Minor oscillations are visible during the quiescent phase. There is also an onset of significant oscillation after drop jetting and exponential decay back towards the quiescent state.

Figure 20A:
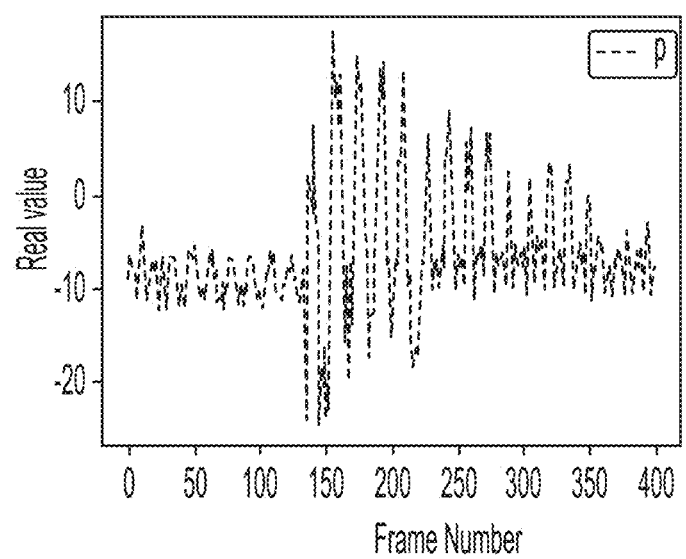
FIGS. 20A and 20B depict a prediction of center displacement instead of model parameters for two different drop ejection rates (e.g., 50 Hz in FIG. 20A, and 100 Hz in FIG. 20B), according to an embodiment.
Figure 20B:
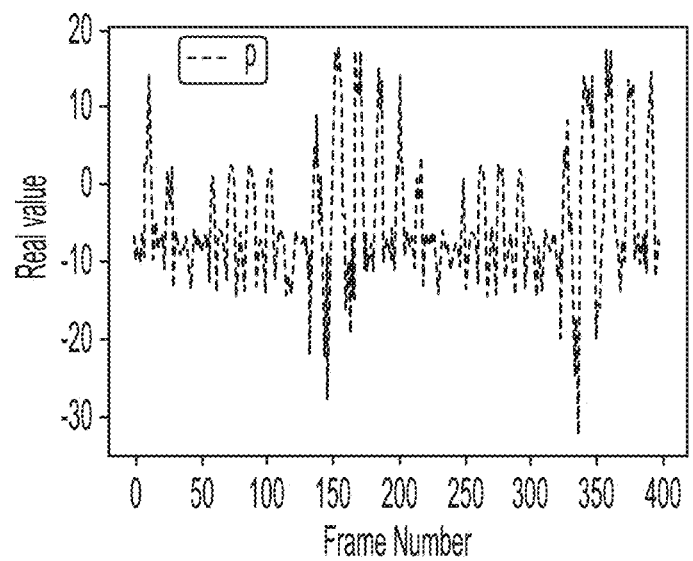

There are multiple possible parameter settings that can result in the same pattern of specular highlights. In a second embodiment of step 914, the ANN may be trained to directly predict central displacement $D_{max}=D(0)$ from input images (e.g., real or synthetic images). As used herein, "central displacement" and/or "maximum displacement" refers to the point on the membrane that has maximum absolute displacement from the steady state. Predicting the maximum displacement eliminates the need to predict multiple solutions to the same image. In this case, the 3D surface may not be reconstructed. Rather, there may be a comparison of the predicted vs true $D_{max}$ values for the synthetic videos/images (from 912). FIGS. 20A and 20B depict graphs showing a maximum displacement prediction for real videos, according to an embodiment. More particularly, FIGS. 20A and 20B show a prediction of center displacement instead of model parameters for two different drop ejection rates (e.g., 50 Hz in FIG. 20A, and 100 Hz in FIG. 20B), according to an embodiment.

Training from synthetic renderings of surfaces to the parameters that were used to generate it may be used to assign a tangible representation to highlights. One of the dangers of training on a simulation is that the neural network may learn to predict the shape of the membrane by taking advantage of artifacts created by the simulation that are not present in actual lab videos of molten metal menisci, or conversely, the mapping learned in the simulation may not be robust to artifacts in the actual lab data (e.g., spurious highlights from metal spatter on the nozzle 114).

Figure 21:
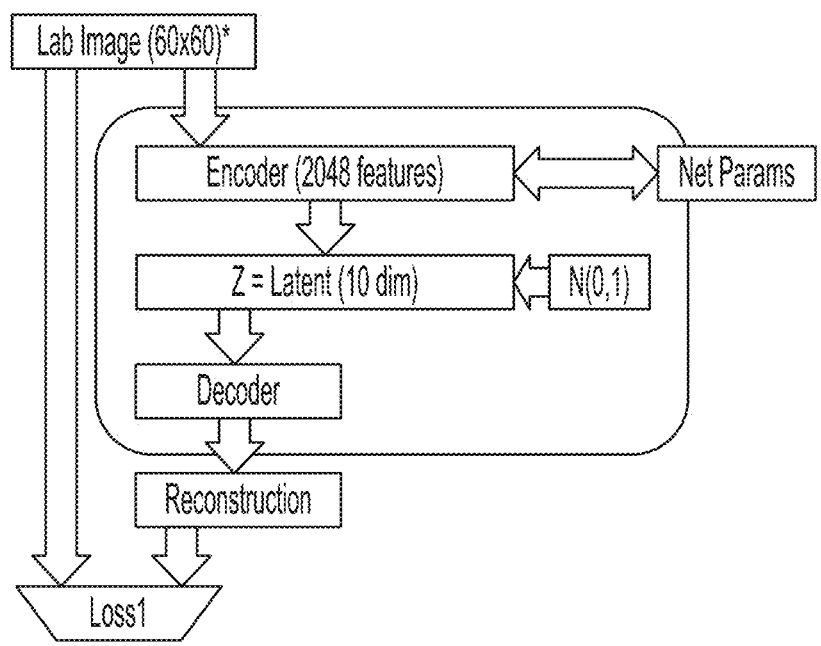
FIG. 21 depicts a flowchart of a method to prevent overfitting, according to an embodiment.

FIG. 21 depicts a flowchart of a method to prevent overfitting, according to an embodiment. To prevent overfitting, a network may be trained first to provide features that are good for describing lab videos. Then, those features may be used to describe synthetic raytraced images. The features may characterize the synthetic images in ways that can also be depended on in the real world. The first step is to use a variational autoencoder (VAE) to learn a network that can regenerate lab video images from themselves. The VAE may compress the image down to a small number of latent variables that presumably encode gross spatial features and ignore noise. The VAE may then reconstruct the image from this small number of latent variables.

Figure 22:
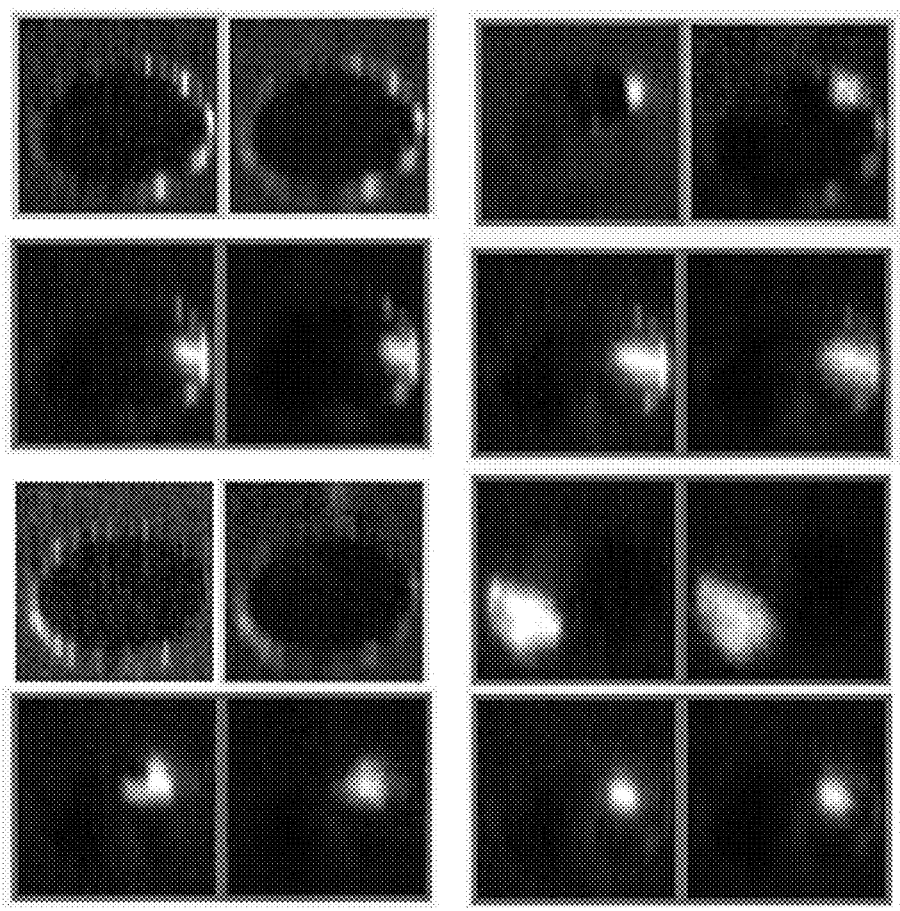
FIG. 22 depicts a plurality of lab video images that were passed through the encoder to create 10 dimensional real-valued descriptions and then reconstructed back to the original size by the decoder, according to an embodiment.

FIG. 22 depicts a plurality of lab video images that were passed through the encoder to create 10 dimensional real-valued descriptions and then reconstructed back to the original size by the decoder, according to an embodiment. For images that are 60×60 pixels, this represents a 360:1 compression. As can be seen by comparing the left and right images in each pair, the reconstructions capture most of the details of the images well.

Figure 23:
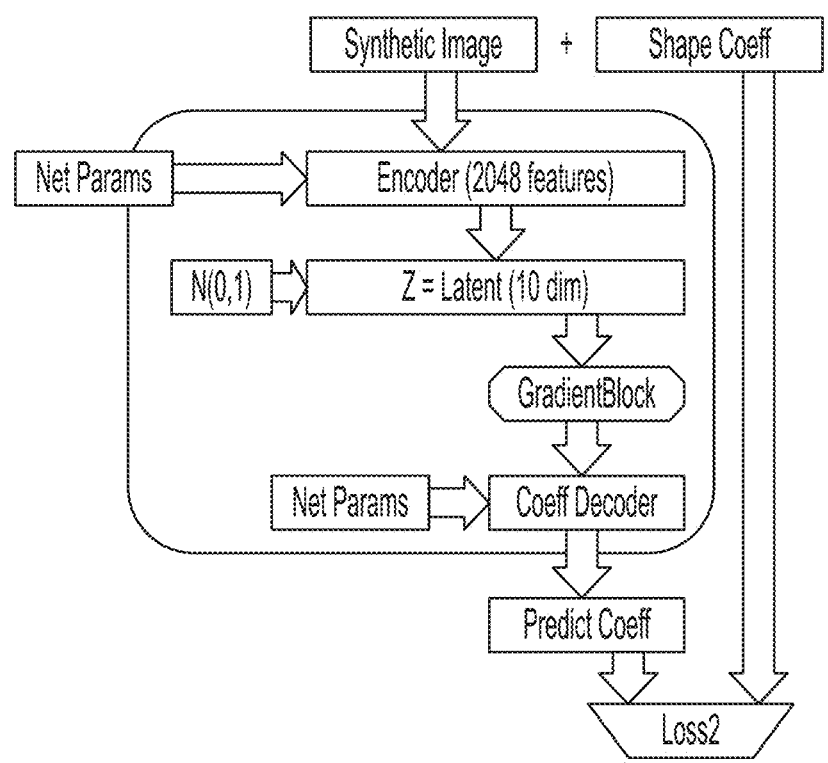
FIG. 23 depicts a flowchart of a method for predicting shape coefficients from images, according to an embodiment.

Once this network is learned, the weights of the encoder may be re-used in a new network to describe synthetic lab images and learn to map these descriptions to shape coefficients describing the membrane. A synthetic image may be input, and then the network may be trained to predict the shape coefficients. FIG. 23 depicts a flowchart of a method for predicting shape coefficients from images, according to an embodiment. The gradient may be blocked coming back from the layer that calculates shape coefficients from the image description features. This prevents the network from altering the feature descriptors and possibly overfitting on the synthetic images features.

Figure 24:
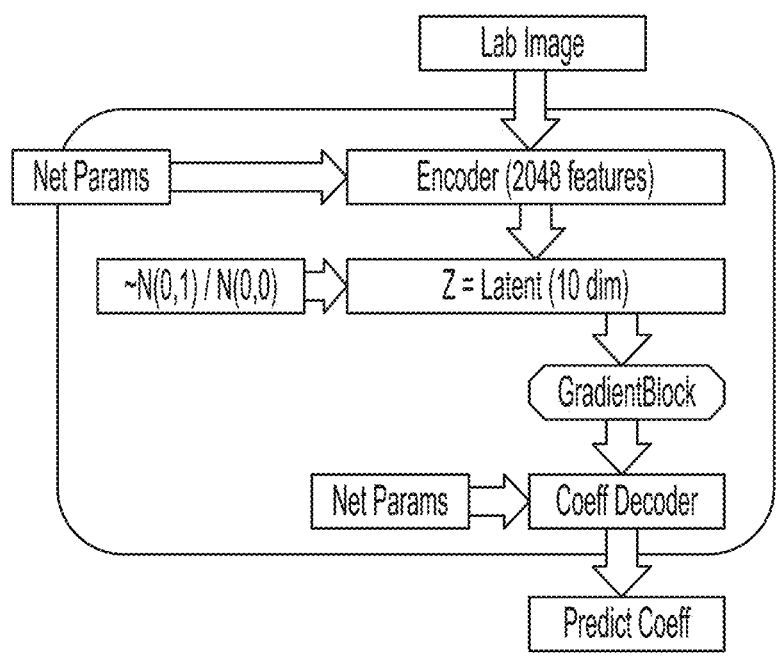
FIG. 24 depicts a flowchart of another method for predicting shape coefficients from images, according to an embodiment.

FIG. 24 depicts a flowchart of another method for predicting shape coefficients from images, according to an embodiment. Once the network is fully trained, it may be used on lab video images to predict shape coefficients from the images.

Figure 25:
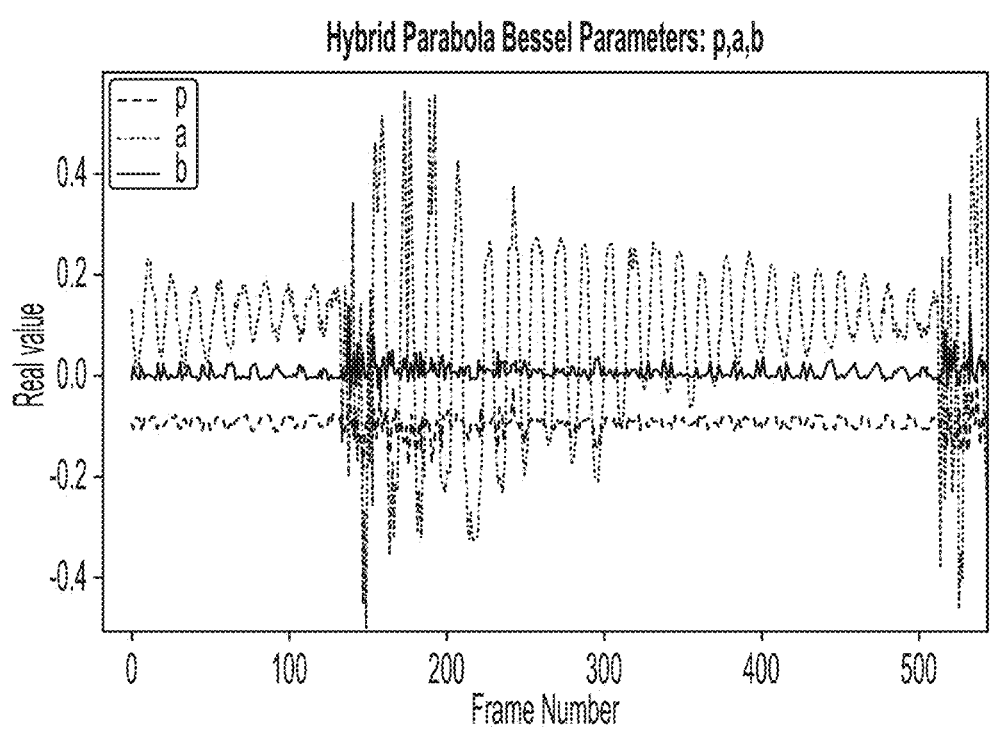
FIG. 25 depicts a graph showing the tracking of the meniscus shape with less noise, according to an embodiment.

The robust features learned indirectly by the VAE on lab data may result in improved tracking of the meniscus shape with less noise. FIG. 25 depicts a graph showing the tracking of the meniscus shape with less noise, according to an embodiment.

Figure 26:
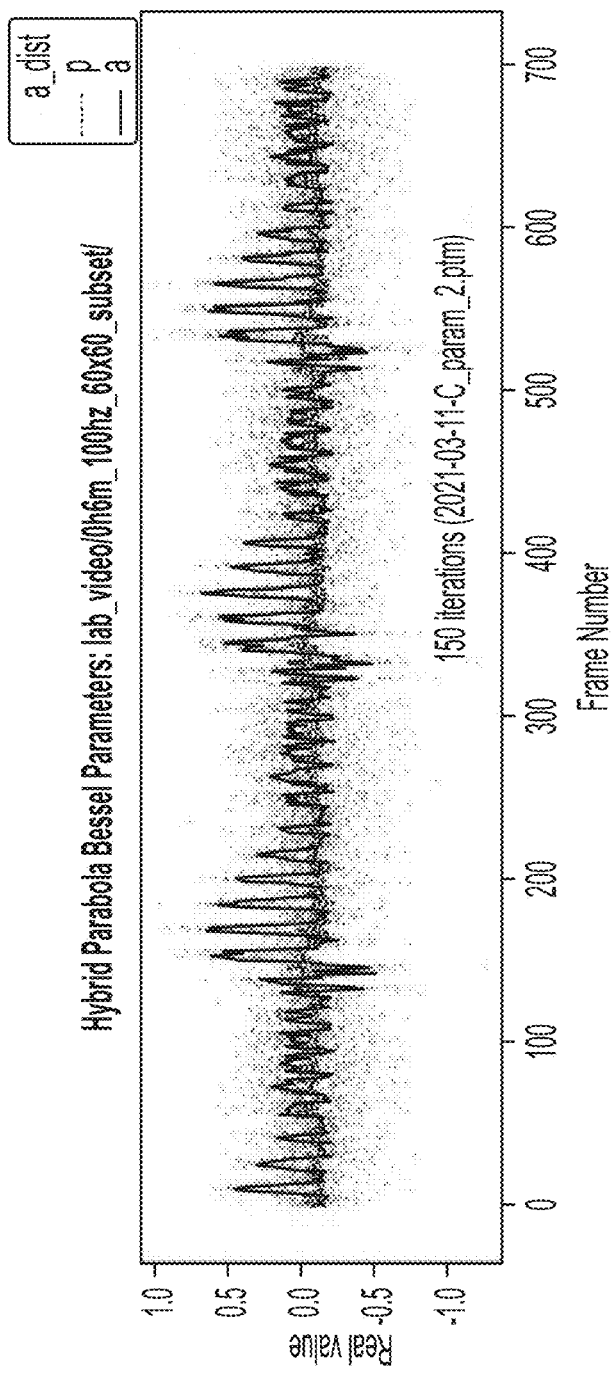
FIG. 26 depicts a graph showing 20 sampled points from the posterior distribution of membrane parameters at each position to create a cloud of uncertainty around the mean estimate showing where uncertainty is greater or smaller, according to an embodiment.

The VAE approach may also provide the ability to represent uncertainty in the outputs of the network. FIG. 26 depicts a graph showing 20 sampled points from the posterior distribution of membrane parameters at each position to create a cloud of uncertainty around the mean estimate showing where uncertainty is greater or smaller, according to an embodiment.

As described in the next section under the nearest-neighbor method, there are more than one set of shape coefficients that can generate the same image. One way to see this is to imagine parts of the membrane that are shadowed by other parts. These shadowed parts may not generate highlights so they can move without altering the image. This poses a problem for the inverse, since there is one image (I) mapping to multiple possible parameters (C1, C2, C3, . . . , CN). One approach to dealing with multiplicity in optimization is to add a regularization term. This term may prefer simplicity. In another approach, a regularization term may be introduced that prefers small coefficient values. Thus, if there are multiple coefficient descriptors that explain an image, the one that does so with the smallest absolute magnitude coefficients may be sought.

It is hard to see how regularization can be directly applied to this problem. In training, some shape coefficients C may be selected, and then the corresponding image may be rendered. The network may then be trained to invert this image by inputting the image (I), and then training the network towards the known shape parameters (C). However, the shape coefficients (C) cannot just be scaled down arbitrarily with a regularizer because the right shape parameters may not be inferred. One solution is to use a unique indirect form of training. The parameters that may generate the same image as the input may be inferred. As a result, the loss is now based on how well the regenerated image from the shape coefficients matches the original. This provides the freedom to regularize the predicted shape coefficients to smaller values if possible as there is still a well-defined training objective, which is to match the regenerated image.

Figure 27:
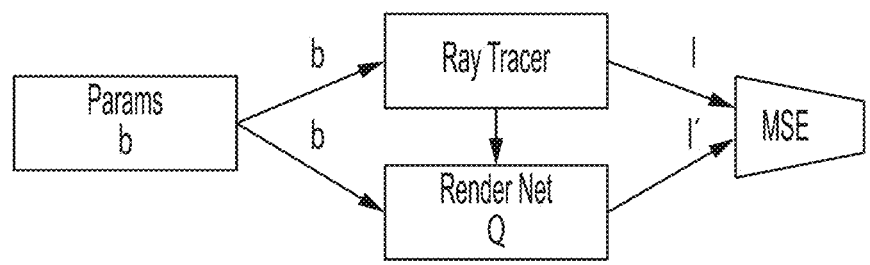
FIG. 27 depicts a schematic image of a differentiable renderer, according to an embodiment.

This approach may then back-propagate errors from the lack of match between the original image and the image generated from the inferred shape coefficients to the network that produced the shape coefficient estimates. This may not work if the image is generated by the Blender ray tracing algorithm. However, a generative neural network may be trained to convert shape coefficients to an image. This may yield a differentiable renderer. FIG. 27 depicts a schematic image of a differentiable renderer, according to an embodiment.

Figure 28:
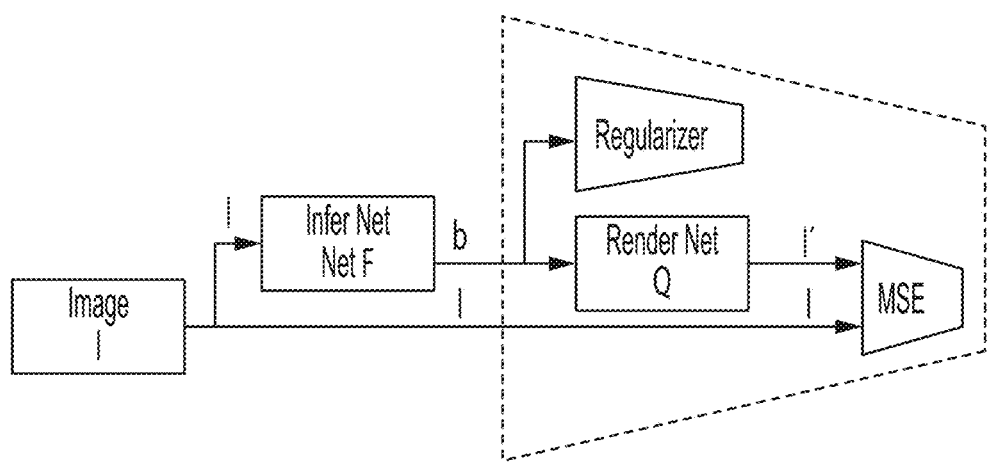
FIG. 28 depicts a schematic image of a loss function used to train a network to estimate shape coefficients from images, according to an embodiment.

Once the differentiable renderer is obtained, it may be used as part of the loss function to train a network to estimate shape coefficients from images. The inference network may then be trained to output coefficients that result in a rendered image that matches the original. FIG. 28 depicts a schematic image of a loss function used to train a network to estimate shape coefficients from images, according to an embodiment.

Figure 29:
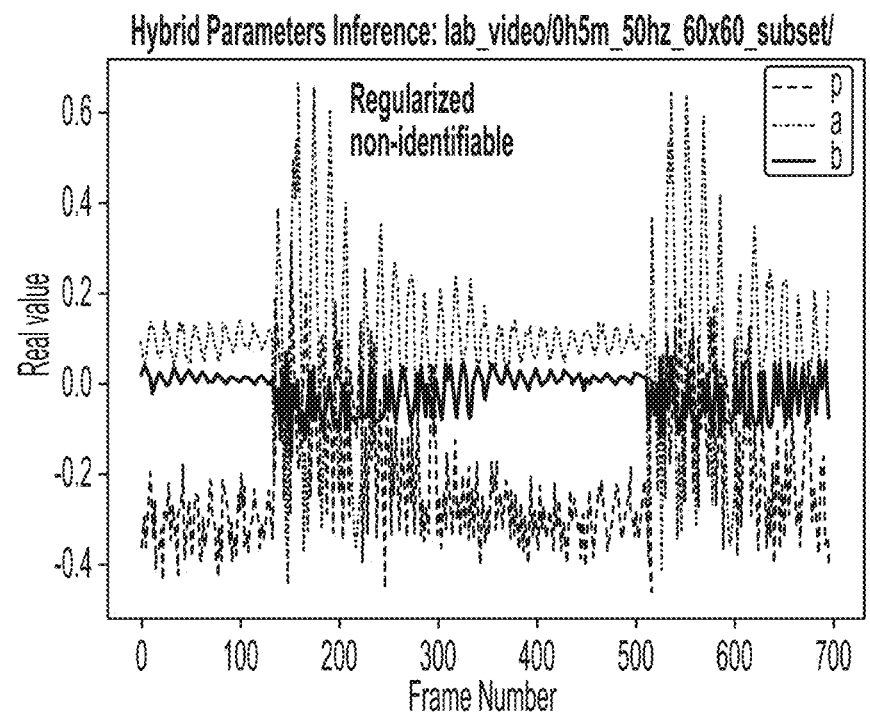
FIG. 29 depicts a graph of a trace from a lab image, according to an embodiment.

This system can be used to successfully train an inference network that recovers shape parameters from synthetic and actual (e.g., lab) images. FIG. 29 depicts a graph of a trace from a lab image, according to an embodiment. The two ideas above can be combined by using the features from the variational autoencoder to generate shape coefficients and then scoring them with the regularized loss function. The result is a robust estimator that produces smoothed outputs.

Figure 30A:
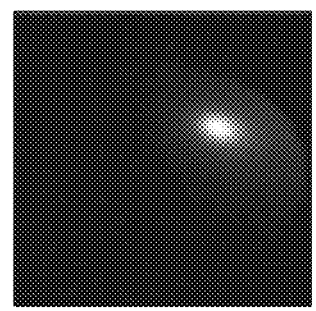
FIG. 30A depicts a video frame.
Figure 30B:
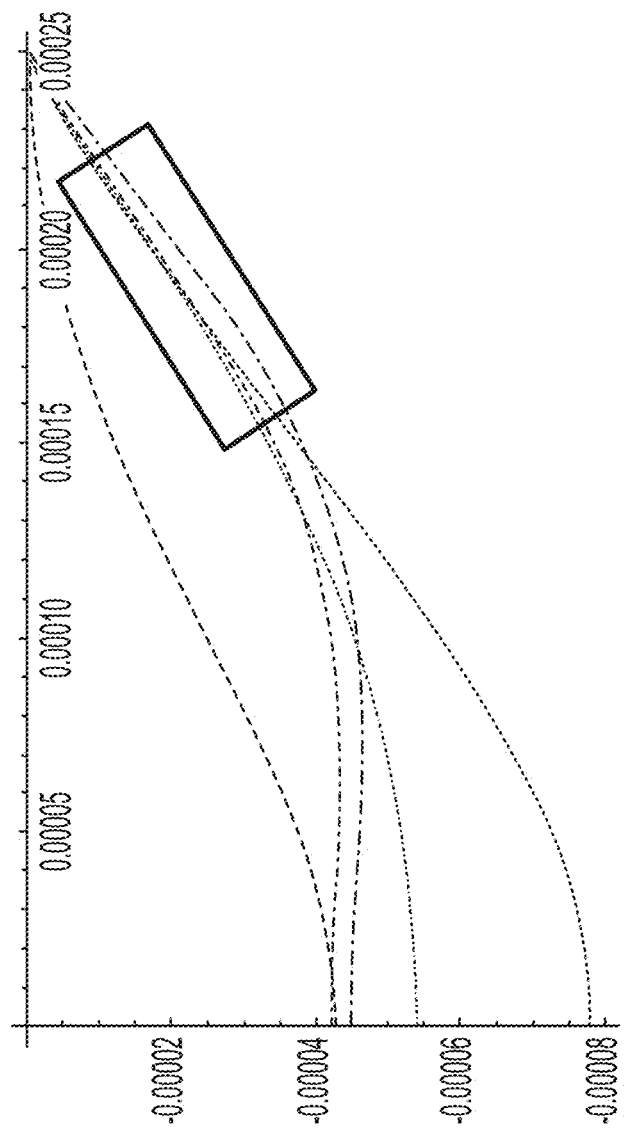
FIG. 30B depicts a graph showing different surfaces whose specular rendering is similar, according to an embodiment.

In a third embodiment of step 914, direct nearest-neighbor matching may be used to select the simulated image in the dataset (from 912) that is most similar (e.g., in mean-square error) to a real input image (from 906). The associated parameters (e.g., [p,a,b]) of the simulated image may then be retrieved for surface reconstruction. The mapping from a given image to underlying parameters under the given imaging conditions may be a one-to-many mapping; namely, many parameter sets can result in the same or similar visual appearance. This is because the main observable feature in the video frame is the specular reflection from a single light source (e.g., light source 150), whose location and shape constrains only a portion of the surface profile, as shown in FIGS. 30A and 30B. More particularly, FIG. 30A depicts a video frame, and FIG. 30B depicts a graph showing different surfaces whose specular rendering is similar, according to an embodiment. The rectangle in FIG. 30B represents the region constrained by the location of the specular highlight.

Figure 31:
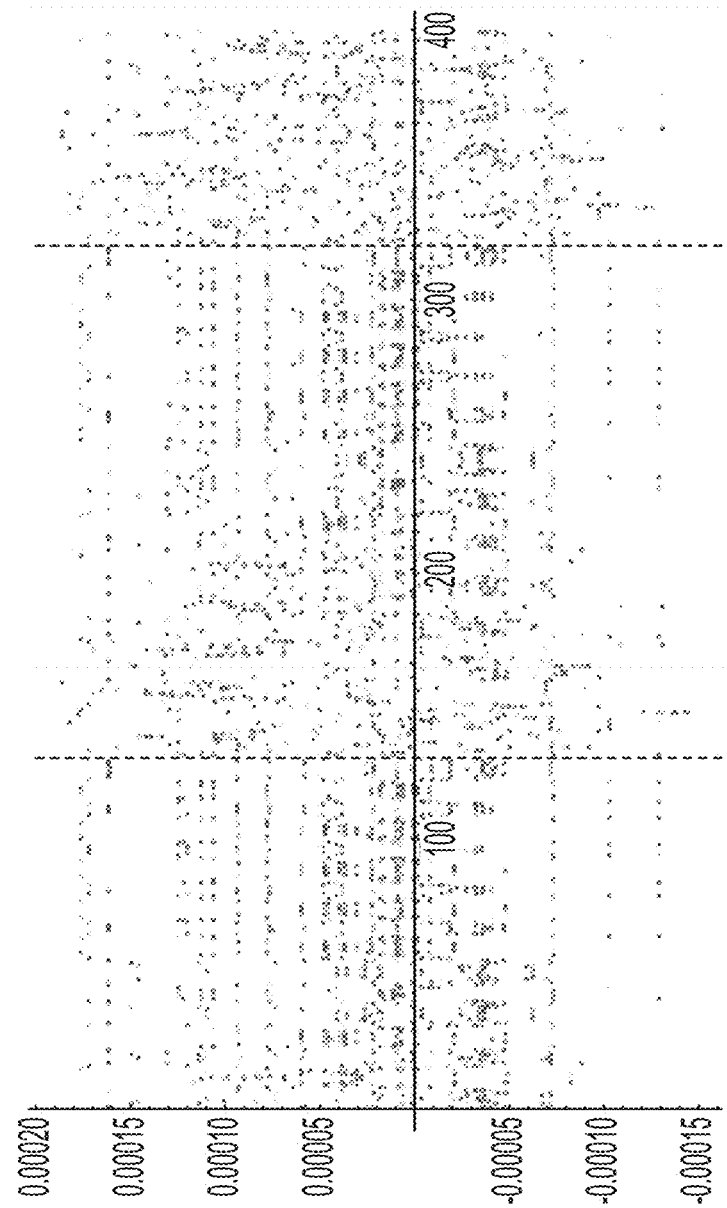
FIG. 31 shows 10 displacements for each frame from the video, according to an embodiment.

To illustrate the third embodiment, the nearest neighbor search may be used to map the video of the meniscus 125 to the maximal displacement of the meniscus 125. First, this may include decomposing the experimental video of the meniscus 125 on a series of T images. For the $t^{th}$ experimental image with t=1, . . . , T, the q synthetic images with the smallest distances from the $t^{th}$ experimental image in the sense of a desired image norm may be identified (e.g., the Euclidean distance between real and synthetic image). Then, using Equation (2) above, the parameters d,p,a,b for every synthetic image 1, . . . , q may be determined. The same parameters may also be determined for all experimental images. The cardinality of the set {d,p,a,b} is 4qT. Ten displacements for each frame from the video are shown in FIG. 31. Because each synthetic image has known meniscus maximal displacement, q maximal displacements may be associated with each real video frame. Let s(t,j) be the maximal displacement of the j-th candidate image j∈{1, . . . , q} at frame index t∈{1, . . . , T}. It is known that maximal displacement's dynamic evolution follows a damped sinusoidal parametrized by:

$$f(c,\gamma,\omega,\phi;t)=c+e^{-\gamma t}\cdot\cos(\omega t+\phi) \quad (3)$$

where c, γ, ω, φ are appropriate parameters to be determined via an appropriate cost function that associates data set {s(t,j)}_{t=1, . . . , T, j∈1, . . . q} and Equation (3), that is to be minimized. The cost function selected to minimize is:

$$J(c,\gamma,\omega,\phi)=\sqrt{\Sigma_{t=1}^{q}(\min_{j=1,\ldots,q}\|s(t,j)-f(c,\gamma,\omega,\phi;t)\|)^2} \quad (4)$$

Figure 32:
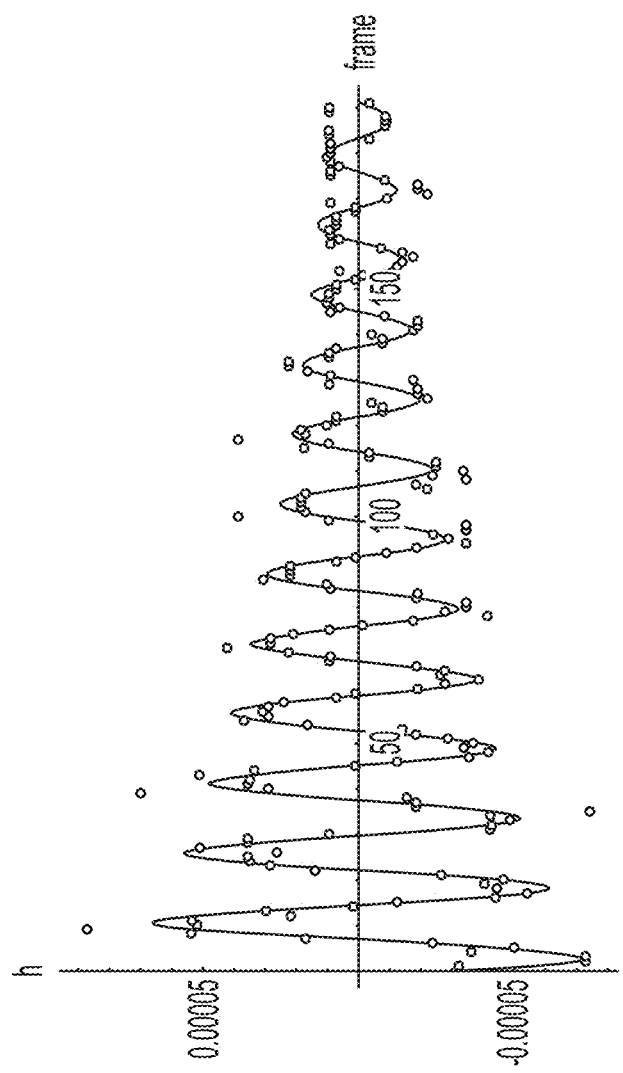
FIG. 32 depicts a graph showing maximal displacements of the meniscus measured using the nearest-neighbor search, according to an embodiment.
Figure 33:
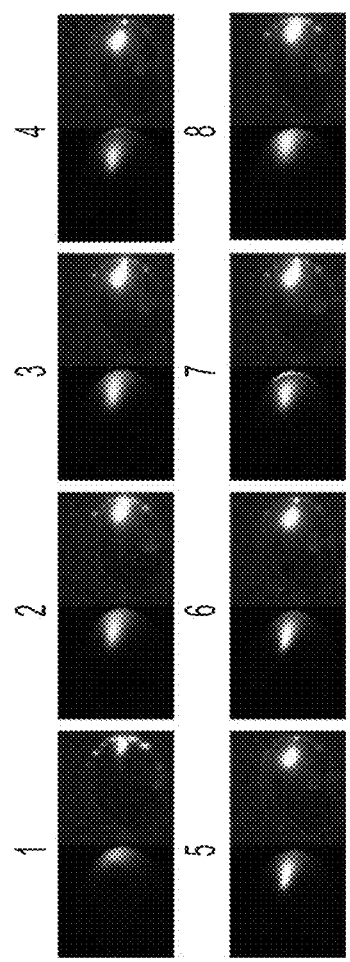
FIG. 33 depicts eight consecutive experimental frames (right) compared to the best fit synthetic frames (left) using the nearest-neighbor approach, according to an embodiment.

FIG. 32 depicts a graph showing maximal displacements of the meniscus measured using the nearest-neighbor search, according to an embodiment. Optimization results may be determined using the cost function in Equation (4). The dots represent the best fits from the set of q nearest neighbors/frame t. FIG. 33 depicts eight consecutive experimental frames (right) compared to the best fit synthetic frames (left) using the nearest-neighbor approach, according to an embodiment.

The method 900 may also include reconstructing the drop 124A in the images (from 906) based at least partially upon the second set of parameters, as at 916. This may include reconstructing the surface (e.g., meniscus 125) of the drop 124A. The method 900 may also include extracting one or more metrics from the reconstructed drop 124A, as at 918. The metrics may be extracted based at least partially upon the reconstructed surface (e.g., meniscus 125) of the drop 124A. This may be part of a post-processing procedure. The extracted metrics may be or include carrier oscillation frequency, maximum envelope amplitude, meniscus amplitude decay rate, pulse-to-pulse covariance, or a combination thereof. The metrics may be used to quantify the behavior of the meniscus 125 of the drop 124A in the nozzle 114. To add a further level of automation, these metrics can be used to train a machine learning (ML) algorithm to predict jetting quality, used in open loop design or closed loop controls.

The method 300 may also include adjusting one or more parameters of the 3D printer 100, as at 920. The parameters may be adjusted based at least partially upon the image (from 906), the model (from 908), the simulation (from 910), the labeled simulated images (from 912), the inverse mapping (from 914), the metrics (from 916), or a combination thereof. The parameters may be adjusted to control the behavior of the meniscus 125 of the liquid printing material 120 (e.g., the drop 124A) in the nozzle 114, which may improve the quality of the 3D object 126.

The parameters to be adjusted may be or include power (e.g., voltage, current, frequency, pulse width, voltage vs time waveform, etc.) provided to the coils 134 by the power source 132. For example, if the behavior of the meniscus 125 is determined to be overdriven, the power delivered to the coils 134 may be decreased. The parameters may also or instead include the amount of heat generated by the heating elements 130, the height of the melt pool, the temperature of the liquid printing material 120 (e.g., the drops 124A-124E), the size of the drops 124A-124E, the frequency at which the drops 124A-124E are ejected, or a combination thereof. In one example, in response to the meniscus amplitude relaxation time being greater than a threshold (e.g., 50% of the pulse period), the jetting rate of the drops 124A-124E may be reduced. The pulse period is the inverse of the jetting frequency. The shape of the waveform that drives the jetting may also be varied.

Instead of or in addition to adjusting a parameter, the metrics may be used to perform open loop design, identification, and/or diagnostics. In one example, this may include comparing predicted parameters to a reference threshold, and using the difference to understand changes in pump dynamics, meniscus vibration modes, etc.

Figure 34A:
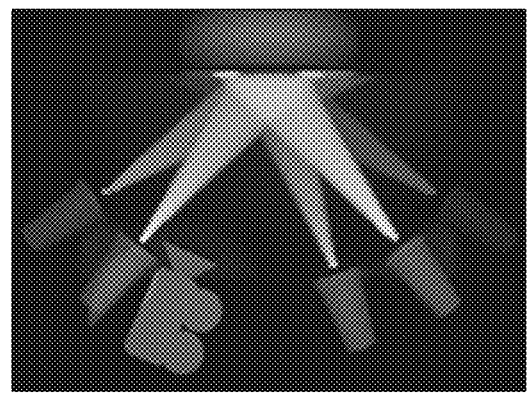
FIG. 34A depicts a plurality of different light sources illuminating the nozzle and/or the drop.
Figure 34B:
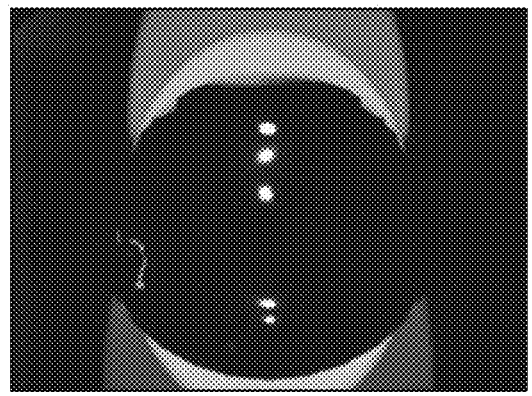
FIG. 34B depicts a simulated image showing reflections on the drop from the light sources, according to an embodiment.

In at least one embodiment, a plurality of different light sources 150 may be used. FIG. 34A depicts a plurality of different light sources (150A-150E) illuminating the nozzle 114 and/or the drop 124A, and FIG. 34B depicts a simulated image showing reflections on the drop 124A from the light sources 150A-150E, according to an embodiment. The light sources 150A-150E may be oriented at different angles with respect to the nozzle 114 and/or the drop 124A. For example, the first light source 150A may be oriented at an angle from about 200 to about 400 (e.g., on a cartesian coordinate system), the second light source 150B may be oriented at an angle from about 500 to about 70°, the third light source 150C may be oriented at an angle from about 900 to about 110°, the fourth light source 150D may be oriented at an angle from about 1100 to about 130°, and the fifth light source 150E may be oriented at an angle from about 1400 to about 170°. The light sources may also or instead have different colors. For example, the first light source 150 may shine a red light, the second light source 150B may shine a yellow light, the third light source 150C may shine a blue light, the fourth light source 150D may shine a green light, and the fifth light source 150E may shine a purple light. The different angles and/or colors may increase the amount of information that can be extracted from the surface (e.g., meniscus 125) of the drop 124A.

Figure 35:
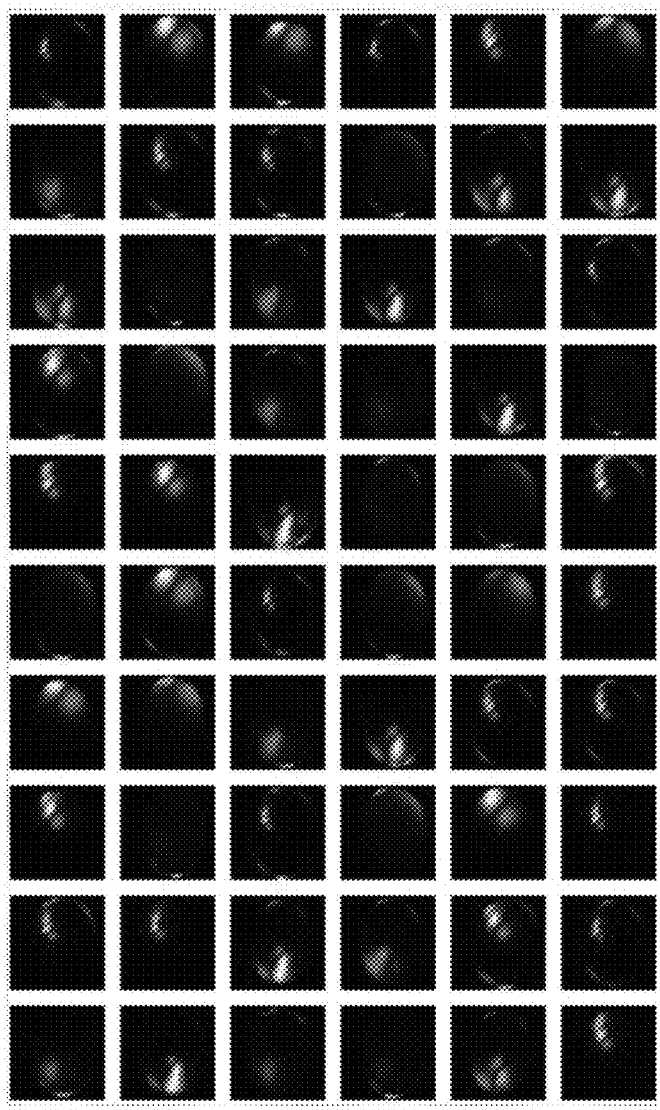
FIG. 35 depicts a plurality of images obtained using a plurality of colored lights to increase the information extracted from specular reflections, according to an embodiment.

FIG. 35 depicts a plurality of images obtained using a plurality of colored lights (e.g., lights 150A-150E) to increase the information extracted from specular reflections, according to an embodiment. If a large variety of membrane shapes are simulated, it may be seen that each of the different colored lights reveals different parts of the surface due to the fact that each colored light is at a different angle. In any particular image, the different colors appear in distinct regions of the membrane and rarely mix which shows that the lights can be used to gather information about different locations on the membrane. This is a distinct improvement over the single highlight, which provides information about only one region of the membrane. Second, when looking at a large number of differently shaped membranes, it may be seen that only a subset of colors is visible in some images, which suggests that the different lights can provide information in different parts of the shape coefficient manifold extending the applicability of our technique to higher accuracy through the complete range of the manifold.

Figure 36:
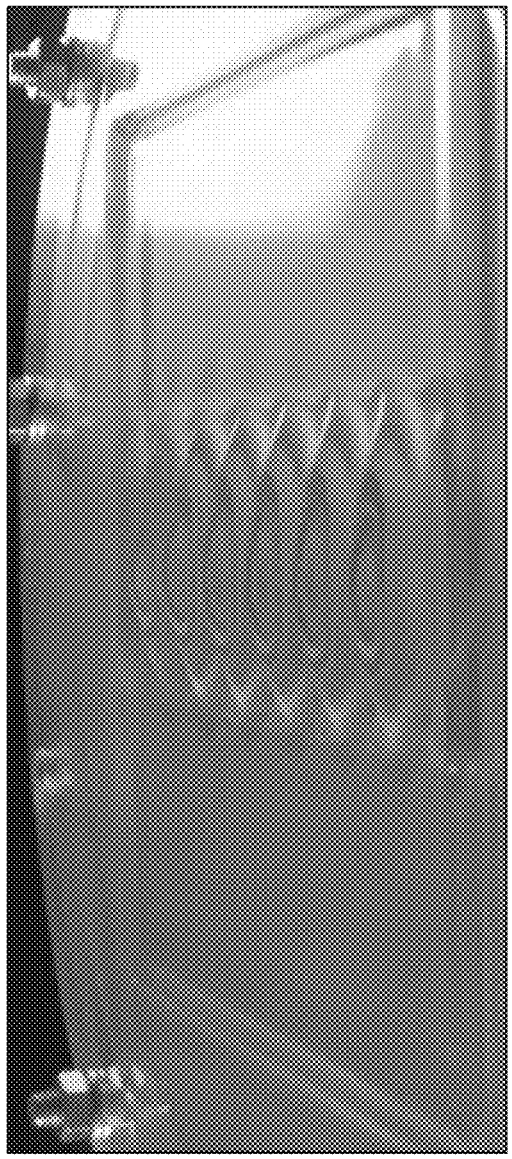
FIG. 36 depicts Faraday waves in a bath of silicon oil, according to an embodiment.

In at least one embodiment, the systems and methods disclosed herein may be used to monitor liquid behaviors in other processes, such as mixing, agitation, sound transmission, or a combination thereof. For example, models of diffraction may be used to simulate images and then learn a model to invert them to recover the wave process. FIG. 36 depicts Faraday waves in a bath of silicon oil, according to an embodiment. The systems and methods disclosed herein may also or instead be based at least partially on optical models (e.g., diffraction) and used to monitor waves from satellite video.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method, comprising:
    defining a model for a liquid while the liquid is positioned at least partially within a nozzle of a printer;
    synthesizing video frames of the liquid using the model to produce synthetic video frames;
    generating a labeled dataset that comprises the synthetic video frames and corresponding model values;
    receiving real video frames of the liquid while the liquid is positioned at least partially within the nozzle of the printer;
    generating an inverse mapping from the real video frames to predicted model values using the labeled dataset;
    reconstructing the liquid in the real video frames based at least partially upon the predicted model values; and
    extracting one or more metrics from the reconstructed liquid, wherein the metrics comprise a carrier oscillation frequency, a pulse-to-pulse covariance, a waveform decay rate, or a combination thereof.

2. The method of claim 1, wherein the model comprises a parametric model.

3. The method of claim 1, wherein the model values comprise:
    a relative weight of a function that describes an oscillation of the liquid;
    a constant offset;
    a constant representing a steady state shape of the liquid at rest;
    or a combination thereof.

4. The method of claim 1, wherein the predicted model values comprise a subset of the model values.

5. The method of claim 1, wherein generating the inverse mapping comprises training an artificial neural network using the labeled dataset to predict the predicted model values in the real video frames.

6. The method of claim 1, wherein generating the inverse mapping comprises selecting an entry from the labeled dataset that is most similar, in mean-square error, to the real video frames using direct nearest-neighbor matching.

7. The method of claim 1, wherein the liquid comprises a meniscus, and wherein reconstructing the liquid comprises reconstructing a shape, a motion, or both of the meniscus.

8. The method of claim 1, further comprising adjusting one or more parameters of the printer based at least partially upon the one or more metrics to adjust the liquid positioned at least partially within the nozzle.

9. The method of claim 8, wherein the one or more parameters comprise an amplitude, a frequency, or both of a waveform from a power source that causes the liquid to be jetted through the nozzle.

10. A visual-based method for performing diagnostics on a printer, the comprising:
    defining a parametric model for a surface of a liquid while the liquid is positioned at least partially within a nozzle of the printer, wherein the surface of the liquid comprises a meniscus;
    synthesizing video frames of the meniscus of the liquid with a graphics simulator using the parametric model to produce synthetic video frames;
    generating a labeled dataset that comprises the synthetic video frames and corresponding parametric model values;
    receiving real video frames of the liquid while the liquid is positioned at least partially within the nozzle of the printer, wherein the synthetic video frames simulate the real video frames;
    generating an inverse mapping from the real video frames to predicted parametric model values using the labeled dataset, wherein the predicted parametric model values are a subset of the parametric model parameter values;
    reconstructing a shape and a motion of the meniscus of the liquid in the real video frames based at least partially upon the predicted parametric model values; and
    extracting one or more metrics from the reconstructed meniscus, wherein the metrics comprise a carrier oscillation frequency, a pulse-to-pulse covariance, a waveform decay rate, or a combination thereof.

11. The method of claim 10, wherein the parametric model values comprise:
a first relative weight of a first Bessel function that describes an oscillation of the liquid;
a second relative weight of a second Bessel function that describes the oscillation of the liquid;
a constant offset;
a constant representing a steady state shape of the meniscus at rest; or
a combination thereof.

12. The method of claim 10, wherein generating the inverse mapping comprises training an artificial neural network using the labeled dataset to predict the predicted parametric model values in the real video frames.

13. The method of claim 10, wherein generating the inverse mapping comprises selecting an entry from the labeled dataset that is most similar, in mean-square error, to the real video frames using direct nearest-neighbor matching.

14. The method of claim 10, further comprising adjusting one or more parameters of the printer based at least partially upon the one or more metrics to adjust the meniscus.

15. A method for characterizing a behavior of a liquid while the liquid is positioned at least partially within a nozzle of a printer, the method comprising:
defining a parametric model for a surface of the liquid while the liquid is positioned at least partially within the nozzle of the printer, wherein the surface of the liquid comprises a meniscus;
synthesizing video frames of the meniscus of the liquid with a graphics simulator using the parametric model to produce synthetic video frames;
generating a labeled dataset that comprises the synthetic video frames and corresponding parametric model values, wherein the parametric model values comprise:
a first relative weight of a first Bessel function that describes an oscillation of the liquid;
a second relative weight of a second Bessel function that describes the oscillation of the liquid;
a constant offset; and
a constant representing a steady state shape of the meniscus at rest;
jetting the liquid through the nozzle;
illuminating the liquid with a light source when the liquid is positioned at least partially within the nozzle;
receiving real video frames of the liquid while the liquid is positioned at least partially within the nozzle, wherein the synthetic video frames simulate the real video frames;
generating an inverse mapping from the real video frames to predicted parametric model values using the labeled dataset, wherein the predicted parametric model values are a subset of the parametric model parameter values, and wherein generating the inverse mapping comprises:
training an artificial neural network using the labeled dataset to predict the predicted parametric model values in the real video frames; or
selecting an entry from the labeled dataset that is most similar, in mean-square error, to the real video frames using direct nearest-neighbor matching;
reconstructing a shape and a motion of the meniscus of the liquid in the real video frames based at least partially upon the predicted parametric model values;
extracting one or more metrics from the reconstructed meniscus, wherein the metrics comprise a carrier oscillation frequency, a pulse-to-pulse covariance, a waveform decay rate, or a combination thereof; and
adjusting one or more parameters of the printer based at least partially upon the one or more metrics to adjust the meniscus.

16. The method of claim 15, wherein illuminating the liquid with the light source comprises illuminating the liquid with a plurality of light sources that are oriented at different angles with respect to the liquid.

17. The method of claim 16, wherein the light sources each have a different color.

18. The method of claim 15, wherein:
the first relative weight has a value between −0.5 and 0.5;
the second relative weight has a value between −0.1 and 0.1;
the constant offset has a value between −1 and 1; and
the constant has a value between 0 and 0.2.

19. The method of claim 15, wherein the one or more parameters comprise an amplitude, a frequency, or both of a waveform from a power source that causes the liquid to be jetted through the nozzle.

* * * * *